US012641428B2

(12) United States Patent
Baskaran et al.

(10) Patent No.: US 12,641,428 B2
(45) Date of Patent: May 26, 2026

(54) DISTINCT USER PLANE SECURITY

(71) Applicant: Lenovo (Singapore) PTE. LTD., New Tech Park (SG)

(72) Inventors: Sheeba Backia Mary Baskaran, Friedrichsdorf (DE); Andreas Kunz, Ladenburg (DE); Genadi Velev, Darmstadt (DE); Prateek Basu Mallick, Dreieich (DE); Joachim Loehr, Wiesbaden (DE); Hyung-Nam Choi, Ottobrunn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 672 days.

(21) Appl. No.: 17/921,090

(22) PCT Filed: Apr. 24, 2021

(86) PCT No.: PCT/IB2021/053391
§ 371 (c)(1),
(2) Date: Oct. 24, 2022

(87) PCT Pub. No.: WO2021/214732
PCT Pub. Date: Oct. 28, 2021

(65) Prior Publication Data
US 2023/0171600 A1 Jun. 1, 2023

Related U.S. Application Data

(60) Provisional application No. 63/015,386, filed on Apr. 24, 2020.

(51) Int. Cl.
*H04M 1/66* (2006.01)
*H04W 12/033* (2021.01)
(Continued)

(52) U.S. Cl.
CPC ....... *H04W 12/086* (2021.01); *H04W 12/033* (2021.01); *H04W 12/041* (2021.01); *H04W 12/0431* (2021.01); *H04W 12/106* (2021.01)

(58) Field of Classification Search
CPC ..... H04W 12/10; H04W 12/06; H04W 12/08; H04W 76/10; H04W 60/00;
(Continued)

(56) References Cited

U.S. PATENT DOCUMENTS

2019/0082325 A1* 3/2019 Muhanna .............. H04W 12/04
2019/0141584 A1* 5/2019 Ben Henda ......... H04W 36/385
(Continued)

FOREIGN PATENT DOCUMENTS

EP        3570577 A2 * 11/2019   ............ H04W 12/04
WO     2019184832 A1    10/2019

OTHER PUBLICATIONS

PCT/IB2021/053391, "Notification of Transmittal of the International Search Report and the Written Opinion of the International Searching authority, or the Declaration", International Searching Authority, Jun. 24, 2021, pp. 1-15.
(Continued)

*Primary Examiner* — Shantell L Heiber
(74) *Attorney, Agent, or Firm* — Kunzler Needham Hilton

(57) ABSTRACT

Apparatuses, methods, and systems are disclosed for setting up multiple user plane ("UP") security contexts. One apparatus includes a transceiver and a processor that derives distinct UP integrity and ciphering keys for a selected central unit user plane ("CU-UP") node in the RAN, said derivation using a key derivation function. The processor assigns a UP Security Indicator to uniquely identify the derived distinct UP integrity and ciphering keys and the transceiver sends a setup request to the selected CU-UP node, said setup request containing the UP Security Indicator and the distinct UP
(Continued)

integrity and ciphering keys. The transceiver receives a setup response from the selected CU-UP node and the processor activates distinct UP security at a UE.

20 Claims, 15 Drawing Sheets

(51) Int. Cl.
| | |
|---|---|
| *H04W 12/041* | (2021.01) |
| *H04W 12/0431* | (2021.01) |
| *H04W 12/086* | (2021.01) |
| *H04W 12/106* | (2021.01) |

(58) Field of Classification Search
CPC .... H04W 12/037; H04L 63/08; H04L 63/061; H04L 9/3242; H04L 9/0618; H04L 9/14; H04L 63/20; H04L 63/205; H04L 2209/80; H04L 9/0861
See application file for complete search history.

(56) References Cited

U.S. PATENT DOCUMENTS

| | | | | |
|---|---|---|---|---|
| 2019/0253881 A1* | 8/2019 | Gage | ..................... | H04W 12/03 |
| 2019/0342800 A1* | 11/2019 | Sirotkin | ................ | H04W 36/02 |
| 2020/0015088 A1* | 1/2020 | Luo | ..................... | H04W 12/041 |
| 2020/0260340 A1* | 8/2020 | Jing | ..................... | H04W 76/10 |
| 2022/0141656 A1* | 5/2022 | Catovic | ............... | H04W 12/009 726/3 |
| 2022/0174481 A1* | 6/2022 | Perras | ................... | H04L 63/045 |
| 2023/0071486 A1* | 3/2023 | Zhu | ....................... | H04W 76/27 |
| 2024/0284178 A1* | 8/2024 | Ben Henda | ......... | H04W 12/106 |

OTHER PUBLICATIONS

CATT, "Discussion on Security of Multi-CU-UP connectivity", 3GPP TSG-SA WG3 Meeting #97 S3-194138, Nov. 18-22, 2019, p. 1-4.

3GPP, "3rd Generation Partnership Project; Technical Specification Group Services and System Aspects; Security architecture and procedures for 5G system (Release 16)", 3GPP TS 33.501 V16.2.0, Mar. 2020, p. 1-227.

3GPP, "3rd Generation Partnership Project; Technical Specification Group Radio Access Network; NR; Physical layer procedures for data (Release 16)", 3GPP TS 38.214 V16.1.0, Mar. 2020, p. 1-151.

3GPP, "3rd Generation Partnership Project; Technical Specification Group Radio Access Network; NG-RAN; Architecture description (Release 16)", 3GPP TS 38.401 V16.1.0, Mar. 2020, pp. 1-50.

3GPP, "3rd Generation Partnership Project; Technical Specification Group Radio Access Network; NG-RAN; E1 Application Protocol (E1AP) (Release 16)", 3GPP TS 38.463 V16.1.1, Apr. 2020, pp. 1-159.

3GPP, "3rd Generation Partnership Project; Technical Specification Group Radio Access Network; Study of further enhancement for disaggregated gNB (Release 16)", 3GPP TR 38.823 V16.0.0, Dec. 2019, p. 1-26.

* cited by examiner

1000

1100

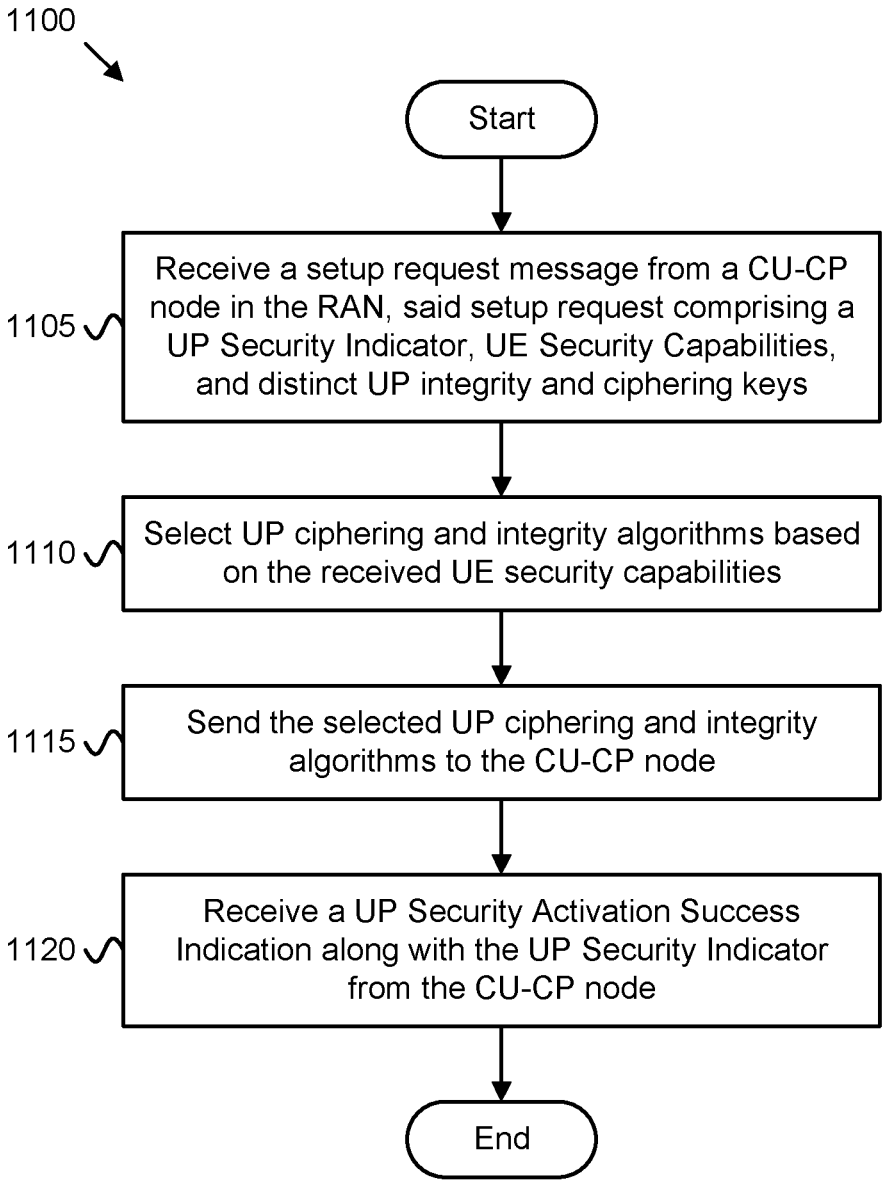

Start

1105 Receive a setup request message from a CU-CP node in the RAN, said setup request comprising a UP Security Indicator, UE Security Capabilities, and distinct UP integrity and ciphering keys 1110 Select UP ciphering and integrity algorithms based on the received UE security capabilities 1115 Send the selected UP ciphering and integrity algorithms to the CU-CP node 1120 Receive a UP Security Activation Success Indication along with the UP Security Indicator from the CU-CP node End

FIG. 11

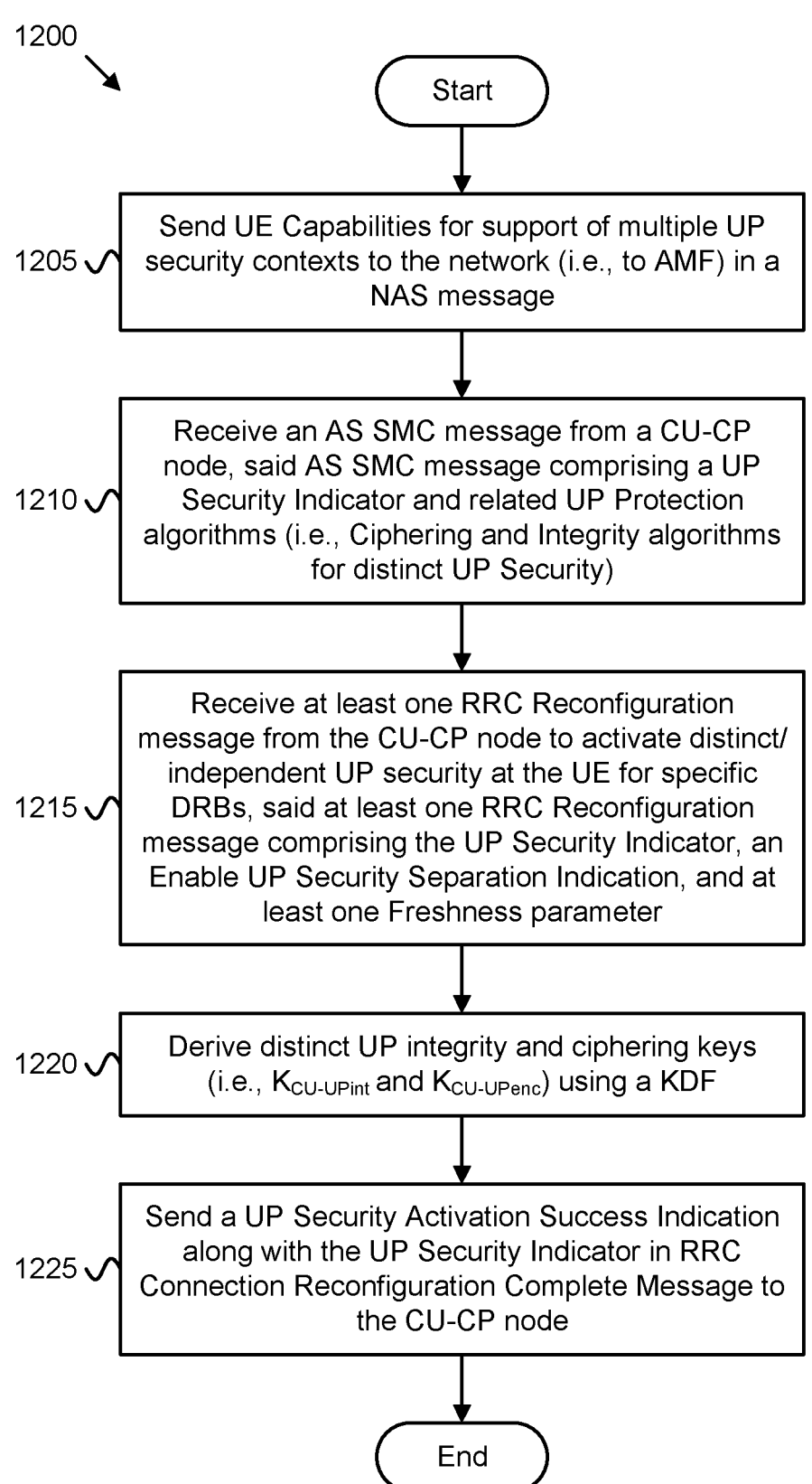

1200

Start

1205   Send UE Capabilities for support of multiple UP security contexts to the network (i.e., to AMF) in a NAS message 1210   Receive an AS SMC message from a CU-CP node, said AS SMC message comprising a UP Security Indicator and related UP Protection algorithms (i.e., Ciphering and Integrity algorithms for distinct UP Security)

1215   Receive at least one RRC Reconfiguration message from the CU-CP node to activate distinct/ independent UP security at the UE for specific DRBs, said at least one RRC Reconfiguration message comprising the UP Security Indicator, an Enable UP Security Separation Indication, and at least one Freshness parameter 1220   Derive distinct UP integrity and ciphering keys (i.e., $K_{CU-UPint}$ and $K_{CU-UPenc}$) using a KDF 1225   Send a UP Security Activation Success Indication along with the UP Security Indicator in RRC Connection Reconfiguration Complete Message to the CU-CP node End

FIG. 12

DISTINCT USER PLANE SECURITY

CROSS-REFERENCE TO RELATED APPLICATIONS

This application claims priority to U.S. Provisional Patent Application No. 63/015,386 entitled "MULTI-UP SECURITY SETUP" and filed on Apr. 24, 2020 for Sheeba Backia Mary Baskaran, Andreas Kunz, Genadi Velev, Prateek Basu Mallick, Joachim Loehr and Hyung-Nam Choi, which application is incorporated herein by reference.

FIELD

The subject matter disclosed herein relates generally to wireless communications and more particularly relates to setting up multiple user plane ("UP") security contexts for a User Equipment ("UE"), e.g., in disaggregated gNB.

BACKGROUND

In certain wireless communication systems, a user-plane integrity key ($K_{UPint}$) and/or user-plane encryption key ($K_{UPenc}$) is used to protect all user plane messages corresponding to different services of UE towards the access network.

BRIEF SUMMARY

Disclosed are procedures for setting up multiple UP security contexts. Said procedures may be implemented by apparatus, systems, methods, or computer program products.

One method of a Central Unit Control Plane ("CU-CP") node includes deriving distinct UP integrity and ciphering keys for a selected Central Unit User Plane ("CU-UP") node in a Radio Access Network ("RAN"), said derivation using a Key Derivation Function ("KDF"). The method includes assigning a user plane ("UP") Security Indicator/Identifier to uniquely identify the derived distinct UP integrity and ciphering keys and sending a setup request to the selected CU-UP node, said setup request containing the UP Security Indicator/Identifier and the distinct UP integrity and ciphering keys. The method includes receiving a setup response from the selected CU-UP node and activating distinct UP security at a User Equipment ("UE").

One method of a CU-UP node includes receives a setup request message from a CU-CP node in the RAN (i.e., gNB-CU-CP) and selecting UP ciphering and integrity algorithms based on the received UE security capabilities, said setup request containing a UP Security Indicator/Identifier, UE Security Capabilities, and distinct UP integrity and ciphering keys. The method includes sending the selected UP ciphering and integrity algorithms to the CU-CP node and receiving an UP Security Activation Success Indication along with the UP Security Indicator/Identifier from the CU-CP node.

One method of a UE includes sending UE Capabilities for support of multiple UP security contexts to the network (i.e., to AMF) in a Non-Access Stratum ("NAS") message. The method further includes receiving an Access Stratum ("AS") Security Mode Command ("SMC") message from a CU-CP node and/or receiving at least one Radio Resource Control ("RRC") Reconfiguration message from the CU-CP node to activate distinct (i.e., independent or different) UP security at the UE for specific Data Radio Bearers ("DRBs"). Here, the AS SMC message contains a UP Security Indicator/

Identifier and related UP Protection algorithms (i.e., Ciphering and Integrity algorithms for distinct UP Security). Moreover, the RRC Reconfiguration message(s) contain the UP Security Indicator/Identifier, an Enable UP Security Separation Indication, and at least one Freshness parameter. The third method includes deriving distinct UP integrity and ciphering keys using a KDF and sending a UP Security Activation Success Indication along with the UP Security Indicator/Identifier in RRC Connection Reconfiguration Complete Message to the CU-CP node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 11 is a flowchart diagram illustrating one embodiment of a second method for multi-UP security setup; and FIG. 12 is a flowchart diagram illustrating one embodiment of a third method for multi-UP security setup.

DETAILED DESCRIPTION

Figure 1:
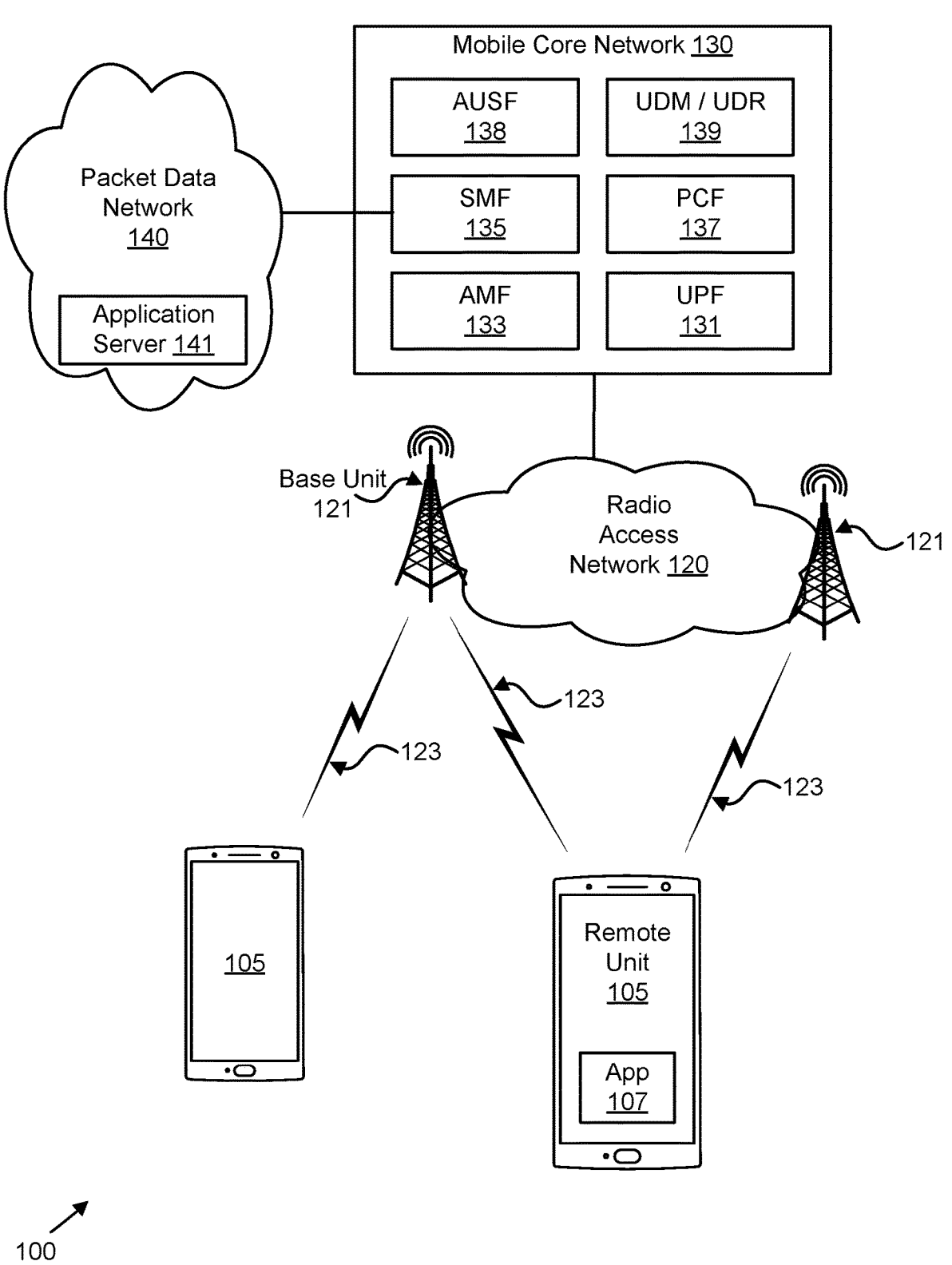
FIG. 1 is a schematic block diagram illustrating one embodiment of a wireless communication system for setting up multiple UP security contexts.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for multi-UP security setup. The 5G system uses a common user plane integrity and encryption key ($K_{UPint}$ and $K_{UPenc}$) to protect all user plane messages corresponding to different services of UE towards different gNB-CU-UP(s). In a scenario where one UE is connected to several gNB-CU-UPs which are located in different security domains, this practice will affect the overall UE's user plane security if one gNB-CU-UP is compromised, e.g., if the user plane security is compromised in one gNB-CU-UP (which is controlled by a 3rd party service/application provider for a specific service or lies in vulnerable location), then it will also breach the other user plane's security handled by other gNB-CU-UPs for different services.

In certain embodiments, gNB deployment may be disaggregated where a gNB-CU-UP can be compromised. Currently there is no solution proposed so far in the 3GPP specification. According to 3GPP TR 38.823, the gNB-CU-CP selects the appropriate gNB-CU-UP(s) for the UE requested services (in a disaggregated gNB scenario shown in FIG. 2A). The current 5G systems assumes that multiple CU-UPs selected by the CU-CP for a UE requested service(s) belongs to same security domain. But in case if multiple CU-UPs belongs to different security domains (trusted and less trusted domains), then a compromise of user plane security established with one CU-UP will breach the security level of other user planes established for the same UE through other CU-UPs. This problem has more likeliness to occur, as currently the 5GS uses same user plane security key ($K_{UPint}$ and $K_{UPenc}$) to protect (Integrity and Confidentiality) all user plane messages between the UE and the gNB irrespective of the trust domain or trust levels of the gNB-CU-UP(s) in a virtual environment.

A more detailed explanation about the user plane security breach is described below with reference to FIGS. 3A and 3B.

FIG. 1 depicts a wireless communication system 100 for setting up multiple UP security contexts, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 130 are depicted in FIG. 1, one of skill in the art will recognize that any number of remote units 105, base units 121, wireless communication links 123, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, access terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130. As described in greater detail below, the RAN 120 may send a measurement and reporting configuration 111 to the remote unit 105, wherein the remote unit 105 sends a measurement report 113 to the RAN 120.

In some embodiments, the remote units 105 communicate with an application server 141 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 141 in the packet data network 140 using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 140. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a Fifth-Generation Core network ("5GC") or an Evolved Packet Core network ("EPC"), which may be coupled to a packet data network 140, like the Internet and private data networks, among other data networks. A remote unit 105 may have a subscription or other account with the mobile core network 130. Each mobile core network 130 belongs to a single PLMN. The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Policy Control Function ("PCF") 137, and a Unified Data Management function ("UDM"). In some embodiments, the UDM is co-located with a User Data Repository ("UDR"), depicted as combined entity "UDM/UDR" 139. In various embodiments, the mobile core network 130 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 130. Moreover, in an LTE variant where the mobile core network 130 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments for setting up multiple UP security contexts apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "gNB" is used for the base station but it is replaceable by any other radio access node, e.g., RAN node, eNB, Base Station ("BS"), Access Point ("AP"), etc. The term UE is used for the user equipment, but it is replaceable by any other radio access node, e.g., mobile terminal ("MT"), access terminal ("AT"), WTRU, IAB node, etc. Further, the operations are described mainly in the context of 5G NR. However, the described solutions/methods are also equally applicable to other mobile communication systems setting up multiple UP security contexts.

Figure 2A:
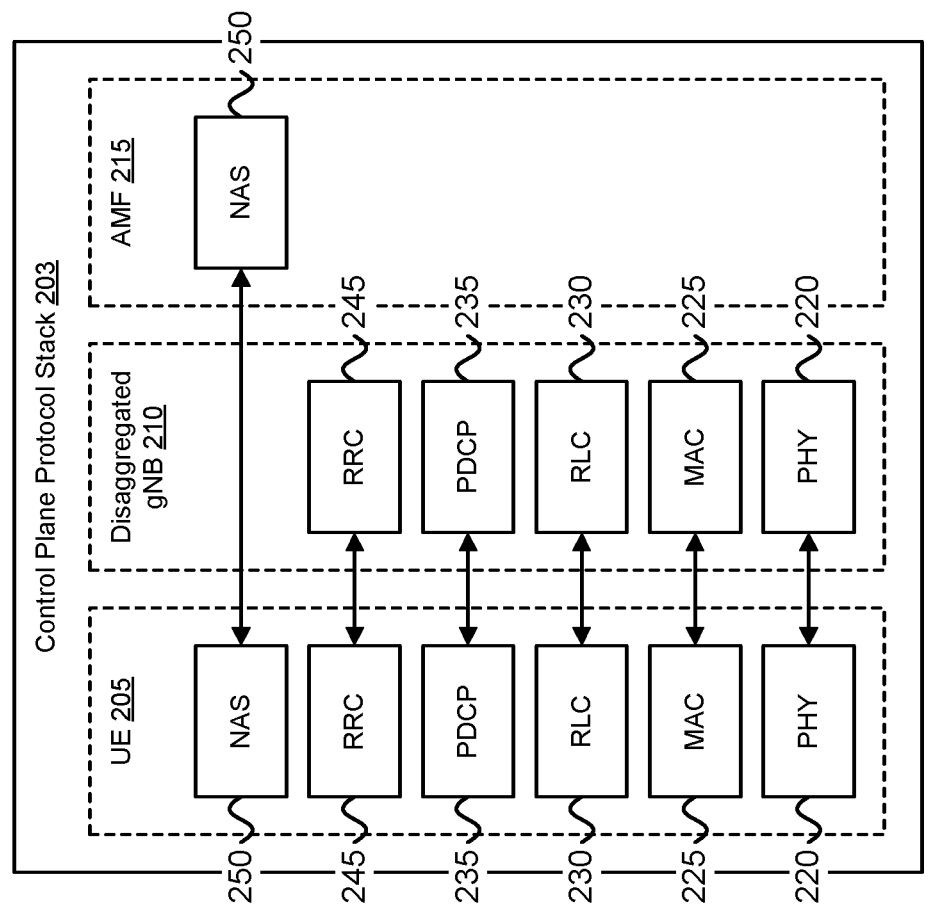
FIG. 2A is a block diagram illustrating one embodiment of a Fifth-Generation ("5G") New Radio ("NR") protocol stack.
Figure 2A:
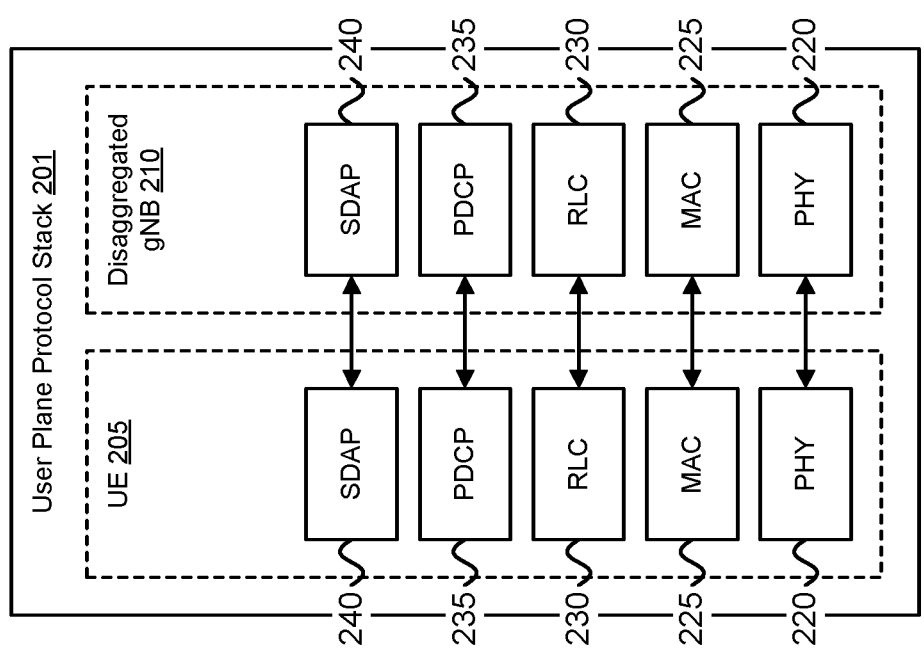

FIG. 2A depicts a NR protocol stack 200, according to embodiments of the disclosure. While FIG. 2A shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform CCA/LBT procedure using energy detection thresholds, as described herein. In certain embodiments, the physical layer 220 may send a notification of UL LBT failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Figure 2B:
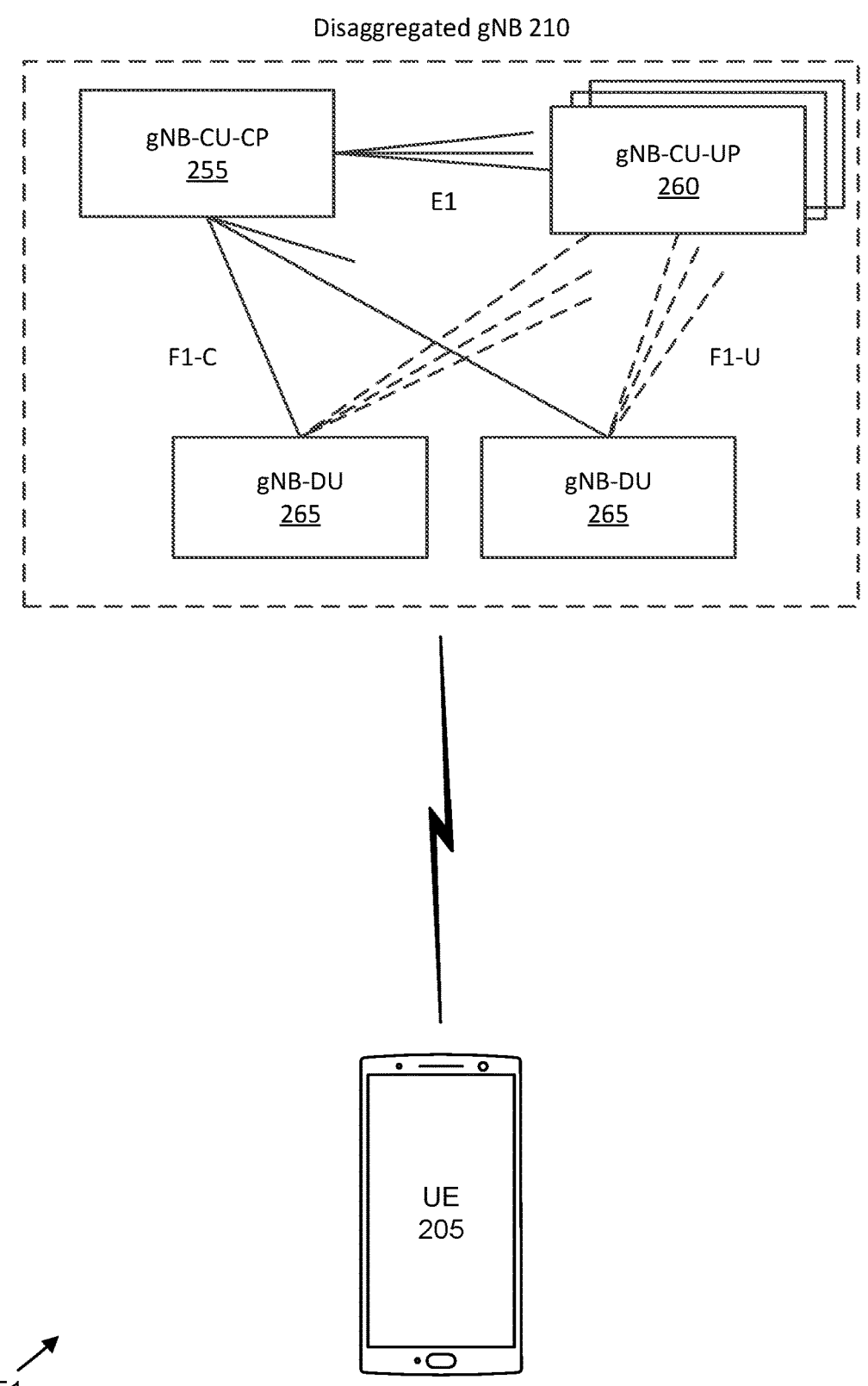
FIG. 2B is a block diagram illustrating one embodiment of the overall architecture for separation of gNB-CU-CP and gNB-CU-UP.

FIG. 2B shows overall architecture 251 for the disaggregated gNB 210, which may be one embodiment of the base unit 121. The disaggregated gNB 210 is separated into a gNB central unit ("gNB-CU") and one or more gNB Distributed Units ("gNB-DU(s)") 265. A gNB-CU and a gNB-DU 265 are connected via F1 interface.

The gNB-CU is a logical node hosting RRC, SDAP and PDCP protocols of the disaggregated gNB 210 that controls the operation of one or more gNB-DUs 265. The gNB-CU terminates the F1 interface connected with the gNB-DU 265. As described below, the F1 interface may be split into a control-plane interface (i.e., F1-C) and a user-plane interface (i.e., F1-U).

Each gNB-DU 265 represents a logical node hosting RLC, MAC and PHY layers of the disaggregated gNB 210, and its operation is partly controlled by gNB-CU. One gNB-DU 265 supports one or multiple cells; however, one cell is supported by only one gNB-DU 265. The gNB-DU 265 terminates the F1 interface connected with the gNB-CU.

As depicted, in disaggregated gNB deployment the gNB-CU may be further separated into a gNB-CU-Control Plane ("gNB-CU-CP") 255 and one or more gNB-CU-User Plane ("gNB-CU-UP") 260. The gNB-CU-CP 255 is a logical node hosting the RRC and the control plane part of the PDCP protocol of the gNB-CU for a disaggregated gNB 210. The gNB-CU-CP 255 terminates the E1 interface connected with the gNB-CU-UP 260 and the F1-C interface connected with the gNB-DU 265.

Each gNB-CU-UP 260 is a logical node hosting the user plane part of the PDCP protocol and the SDAP protocol of the gNB-CU for a disaggregated gNB 210. The gNB-CU-UP 260 terminates the E1 interface connected with the gNB-CU-CP 255 and the F1-U interface connected with the gNB-DU 265.

Figure 3A:
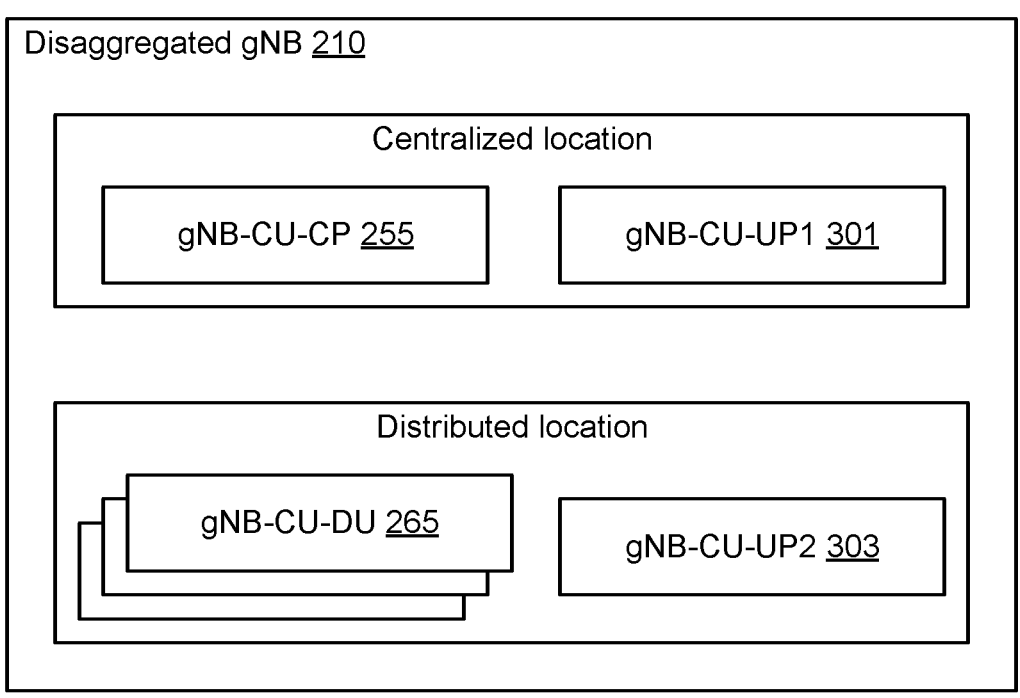
FIG. 3A is a diagram illustrating one embodiment of centralized CU-UP and distributed CU-UP.

FIG. 3A depicts a deployment of disaggregated gNB 210 relating to a first threat scenario involving centralized CU-UP and distributed CU-UP. In a first UP security breach scenario ("Case 1"), different gNB-CU-Ups 260 may be deployed physically far from each other, e.g., collocated with the gNB-DU, or deployed in central data center. In the depicted embodiment, a the first gNB-CU-UP 301 (depicted as "gNB-CU-UP1") is located at a centralized location, while a second gNB-CU-UP 303 (depicted as "gNB-CU-UP2") is located at a distributed location, e.g., collocated with one or more gNB-DU 265. This deployment may be used where the first gNB-CU-UP 301 provides eMBB service, while the second gNB-CU-UP 303 provides low-latency service. It is possible that one UE 205 supports multiple service types at the same time. To avoid the impact of a security breach in the second gNB-CU-UP 303 also compromising the first gNB-CU-UP 301, the two CU-UP entities are to belong to different security domain.

Figure 3B:
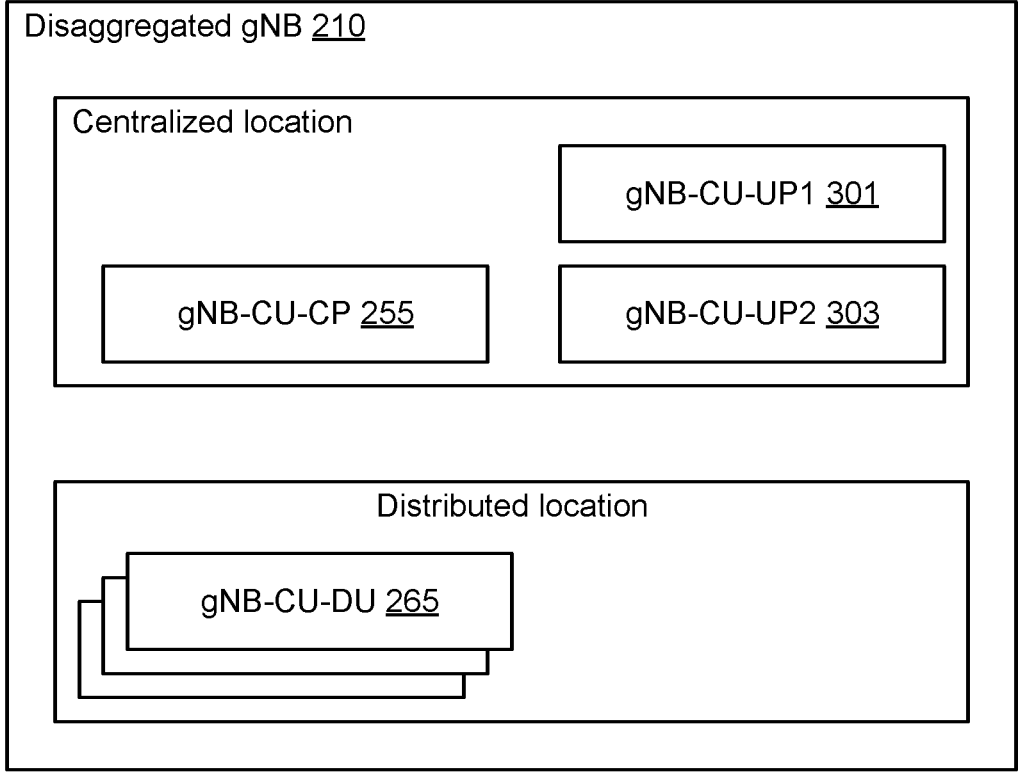
FIG. 3B is a diagram illustrating one embodiment of centralized CU-UPs open to third-party.

FIG. 3B depicts a deployment of the disaggregated gNB 210 relating to a second threat scenario involving centralized CU-UPs open to access by a third-party. In a second UP security breach scenario ("Case 2"), different gNB-CU-UPs 260 may be deployed in a centralized location, e.g., collo-cated with the gNB-CU-CP 255, as shown in FIG. 3B. Note, that CU-UPs opened to a third party are not have the same level of trust. In this example, the first gNB-CU-UP 301 and the second gNB-CU-UP 303 are deployed at the centralized location. The two CU-UP entities 301, 303 may have different security levels, regardless of whether the first gNB-CU-UP 301 and the second gNB-CU-UP 303 are collocated or not. Otherwise, if the second gNB-CU-UP 303 is open to third party, a security breach in the second gNB-CU-UP 303 would compromise the first gNB-CU-UP 301 if the two CU-UP entities belong to the same security domain.

The first solution introduces multiple user plane service security contexts between the UE 205 and the gNB-CU-UPs 260 with which the operator has a different trust level based on the deployment location and/or third party application service provider involvement. The cryptographic separation of the UE's user plane security among different gNB-CU-UPs 260 prevents security breach of the overall CP-UP(s)/ user plane when security at any gNB-CU-UP 260 is compromised. Although the described solutions and the described embodiments in this disclosure focus mainly on NR RAT (i.e., gNB) connected to 5GC, they are principally applicable to E-UTRA RAT (eNB/ng-eNB) connected to 5GC as well.

According to the first solution, the process of setting up distinct user plane (UP) service security between UE and one or more gNB-CU-UPs involves the following steps/sub-process:

At Step A, the gNB-CU-CP 255 determines the UP security key derivation type based on the gNB-CU-UP trust level. The UP security key derivation type may be deter-mined as follows:

Type1—Common UP Security: If the gNB-CU-UP(s) 260 selected by the gNB-CU-CP 255 belongs to the operator's security domain, then the gNB-CU-CP 255 does not need to initiate Cryptographically separate UP Security setup. Rather, the gNB-CU-CP 255 may initiate Common UP Security setup, e.g., deriving keys $K_{UPenc}$ and $K_{UPint}$ from key $K_{gNB}$. One example of common UP security setup is specified in TS 33.501.

Type2—Cryptographically separate UP Security: If the selected gNB-CU-UP(s) 260 belongs to a different security domain (or considered less trusted by the gNB-CU-CP 255), then the gNB-CU-CP 255 determines to initiate Crypto-graphically separate UP Security setup for each of those gNB-CU-UP(s) 260, where the UP security for one gNB-CU-UP 260 will be different/distinct from the UP security for other gNB-CU-UP(s) 260. Further the gNB-CU-CP 255 may perform CU-UP specific Independent User Plane Secu-rity key derivation, e.g., as described below with reference to FIG. 5A or FIG. 5B.

Here the terms 'Independent UP security' and 'Distinct UP security' in this disclosure refer to setting up/creating a separate UP security context (integrity and ciphering key) for each pairing of UE 205 and gNB-CU-UP 260. Here, each independent/distinct UP security context is cryptographi-cally separate from the other UP Security Context of the same UE 205 with other gNB-CU-UP(s) 260 in the disag-gregated gNB deployment. Therefore, for the cases described below in Options 1 and 2 of the first solution, a UE 205 and disaggregated gNB 210 need to set up multiple UP security contexts. This disclosure interchangeably uses the terms 'Independent UP security' and 'Distinct UP security' referring to Cryptographically separate UP Security Context or Key and all these terms conveys the same meaning.

Type2 key derivation may be used for Distinct UP Secu-rity and/or Independent UP Security. Note that a gNB-CU-CP 255 determines to derive distinct user plane ("UP") security context with cryptographic separation which need to be different from the existing common UP security context based on the selected gNB-CU-UP's trust level, deployment location and gNB-CU-CP's local policy.

At Step B, UP security algorithm negotiation and selec-tion occurs for distinct UP security by the gNB-CU-CP 255 or by the gNB-CU-UP 260 having different trust level (controlled/operated by the third party application provider) or belonging to a different security domain.

At Step C, independent UP security activation by NG-RAN/5G-NR with the UE 205 occurs using RRC Con-nection Reconfiguration Procedure (either per gNB-CU-UP 260 individually or aggregated in one RRC Connection Reconfiguration Request).

The method of determining and establishing multi-user plane security by gNB-CU-CP 255 for a UE 205 is described by specifying the steps involved during the above steps/sub-processes (A-C) in detail for the two procedures described below with reference to FIGS. 4A-4B (Option 1) and FIG. 6 (Option 2)

Figure 4A:
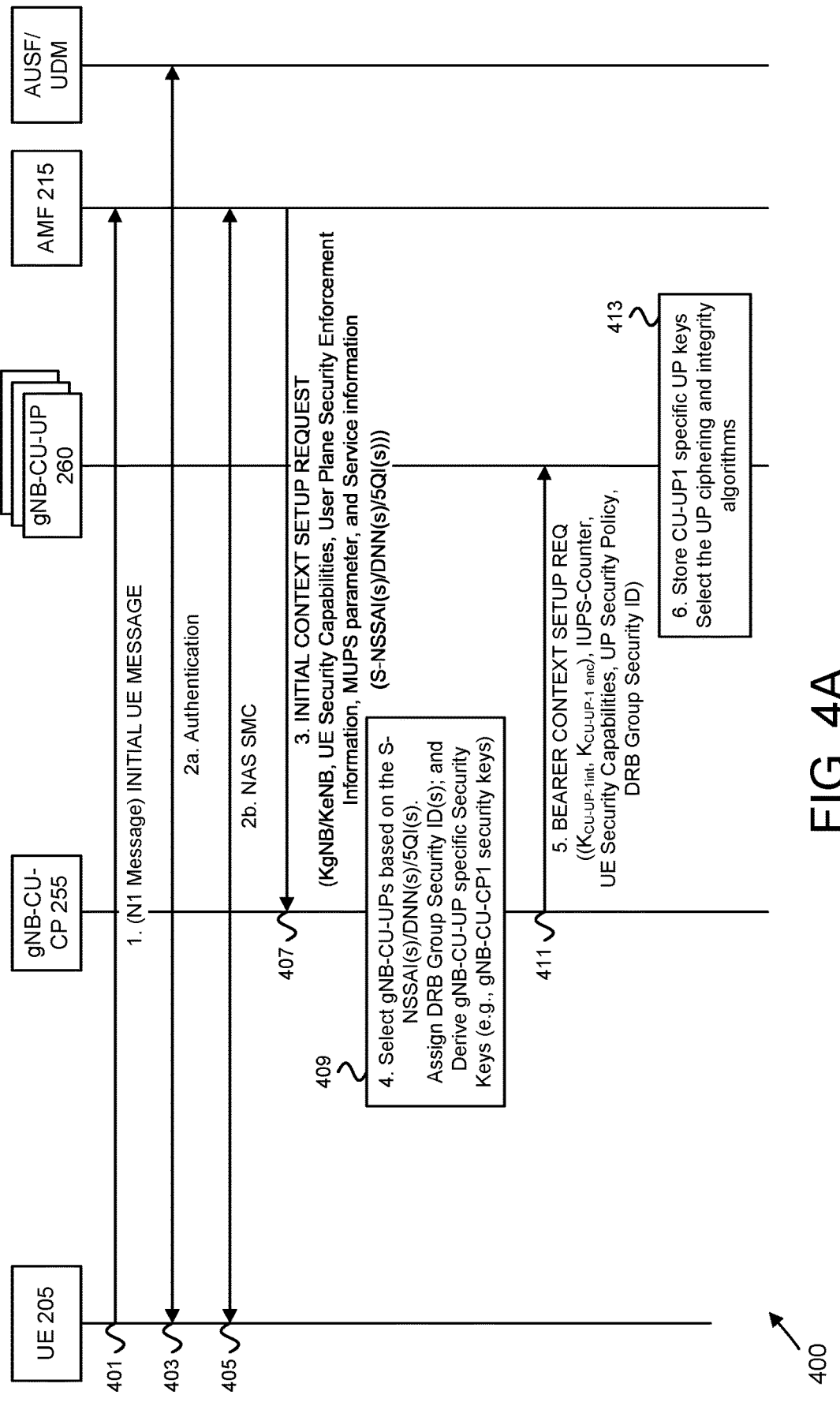
FIG. 4A is a diagram illustrating one embodiment of a procedure for multi-UP security setup using Bearer Context Setup messages.
Figure 4B:
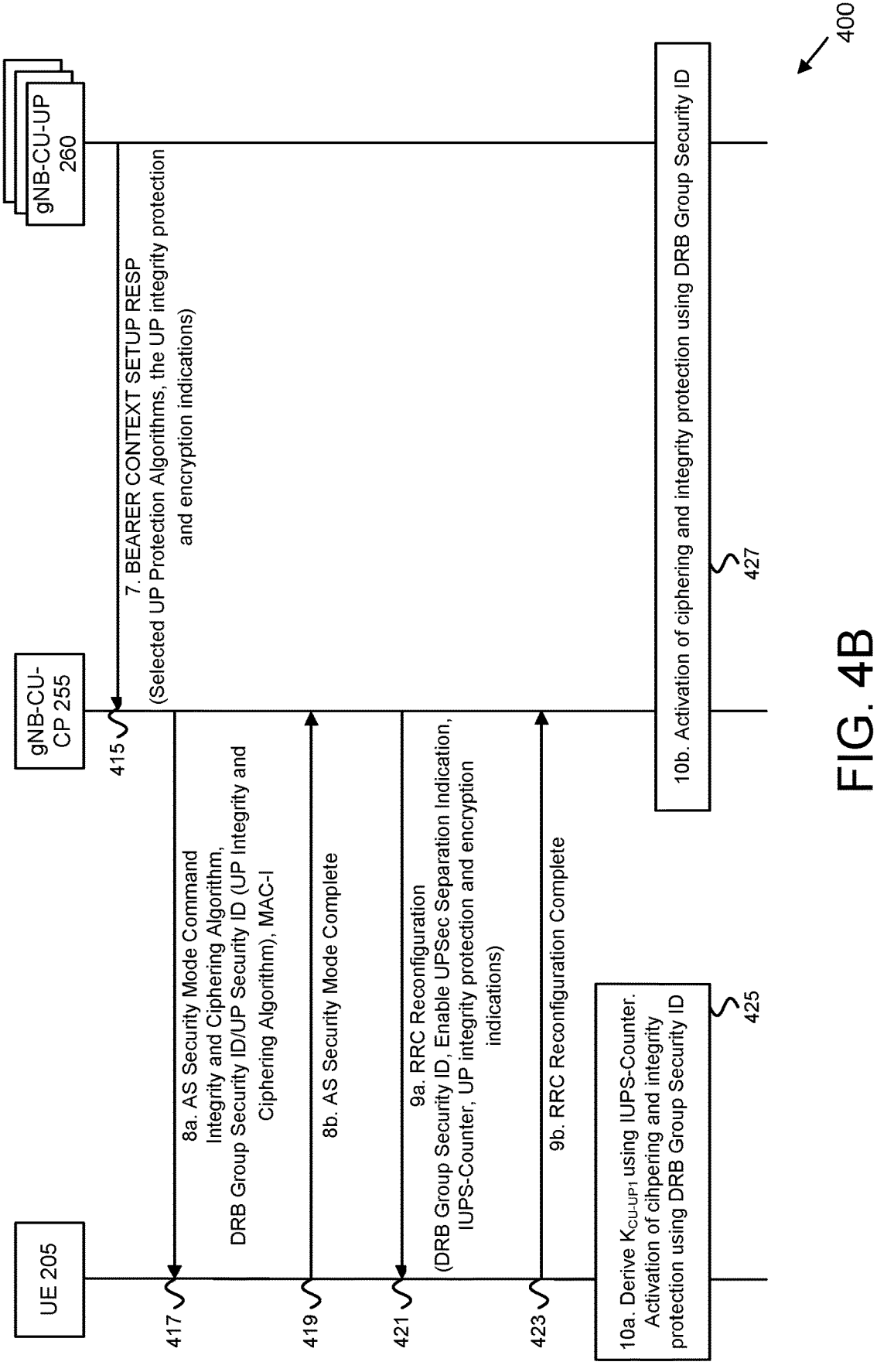
FIG. 4B is a continuation of FIG. 4A.

FIGS. 4A-4B depict a first procedure 400 for multi-user plane security, according to embodiments of the disclosure. These figures represent a first option (Setup Option 1) for Multi-UP Security setup according to the first solution. The first procedure 400 is performed during the UE initial attachment procedure with the 5G system (e.g., registration procedure). The first procedure 400 supports multi-UP secu-rity for UE in 5G System.

A multi-UP security as used in this disclosure is defined as having one Common UP Security context and also having one or more distinct/independent UP Security context at the UE and 5G-NR/gNB. The Common UP Security context protects all DRBs terminating at one or more gNB-CU-UPs 260 belonging to same security domain/controlled by the operator, while each distinct/independent UP Security con-text protects all DRBs terminating at one or more gNB-CU-UPs 260, each belonging to a different security domain or location (or controlled by a third-party application service provider).

Note that in FIGS. 4A-4B, all the DRB Group Security ID can be otherwise termed as 'UP Security ID' or 'UP Security Indicator'. These terms may be used interchangeable in this disclosure, and all convey the same meaning. The steps involved for independent multi-user plane security context setup at 5G NR and activation at the UE 205 as shown in FIGS. 4A-4B are described as follows:

Starting at FIG. 4A, in Step 1 the UE 205 sends an initial NAS message to the 5G core network, i.e., to the AMF 215 (see messaging 401). In one embodiment, the initial NAS message contains a Registration Request. In another embodiment, the initial NAS message contains a Service Request. The procedure the UE 205 uses to establish cryptographic protection for radio bearers is initiated by an NAS Registration Request message or Service Request message with "PDU session(s) to be established/re-activated" included from the UE 205 to the AMF 215, e.g., as specified in 3GPP TS 33.501, clause 6.8.1.2.2.

At Step 2a, the 5G core network (e.g., AMF 215 along with AUSF and UDM) performs primary authentication with the UE 205, if required (see messaging 403).

At Step 2B, after successful authentication, the AMF 215 initiates and performs NAS Security mode command procedure with the UE 205 to select NAS security algorithms and establish NAS security context (see messaging 405). In some embodiments, the Initial NAS message containing the UE security capabilities may include an additional information element, i.e., a Multi-UP Security ("MUPS") parameter, indicating MUPS support and/or a maximum number of supported groups, i.e., maximum number of independent security contexts for the gNB-CU-UPs 260.

At Step 3, the AMF 215 sends an Initial Context Setup Request to RAN, i.e., to the gNB-CU-CP 255 (see messaging 407). The Initial Context Setup Request is sent with key $K_{gNB}$, UE Security Capabilities, MUPS parameter, User Plane Security Enforcement Information and Service information (e.g., S-NSSAI(s) and/or DNN(s) and/or 5QI(s)) to trigger the access security establishment between the disaggregated gNB 210 and the UE 205.

Alternatively, the AMF 215 may initiate the procedure to establish cryptographic protection for radio bearers when "PDU session(s) to be re-activated" is not included in the Registration request and where there is pending downlink UP data or pending downlink signaling. In addition, the 5GC may activate UP resources for one or more PDU sessions. In such case, the SMF(s) may send N2-SM information container to the RAN (i.e., to the disaggregated gNB 210).

At Step 4, upon activation of UP resources for the Uu interface, the gNB-CU-CP 255 may select one or more gNB-CU-UPs 260 (see block 409). Here, the selection takes into consideration the N2 SM information (e.g., service information like S-NSSAI/DNN/5QI and the MUPS parameter) received from the 5GC for activation of UP resources. Here, it is assumed that the gNB-CU-CP 255 selects at least one gNB-CU-UP 260 belonging to a different security domain or operated/controlled by a third party application service provider having a less trust level than the operator controlled gNB-CU-UPs 260. Accordingly, the gNB-CU-CP 255 determines to initiate a distinct/independent user plane security setup for the data radio bearers terminating with that specific selected gNB-CU-UP 260.

Note that the gNB-CU-CP 255 may similarly initiate multiple distinct/independent user plane security for the same UE with any number of gNB-CU-UPs 260 belonging to various different security domains if they are selected to provide more than one type of service(s) for the UE 205. Also note that if the UE 205 does not support multiple UP security as indicated in the MUPS parameter, then the gNB-CU-CP 255 does not activate any UP resources that require a different security context.

If the gNB-CU-CP 255 determines to initiate distinct/independent user plane security related to the specific gNB-CU-UP 260 based on its deployment and trust level, then the gNB-CU-CP 255 assigns a dedicated DRB Group Security ID (otherwise called as UP Security Indicator or Identifier ("ID")) for the selected gNB-CU-UP 260.

The purpose of the DRB Group Security ID/UP Security Indicator/UP Security Identifier is to uniquely identify the distinct security context derived by the gNB-CU-CP 255 to protect the UP traffic terminating with a specific selected gNB-CU-UP 260 having less trust level (or belonging to a different security domain). Further, the DRB Group Security ID may also be used to indicate the set of all DRBs that can be established/terminating with the selected gNB-CU-UP 260 for a UE service which applies the common UP Security Context, but distinct from the other gNB-CU-UP security context. The grouping/addition of DRBs to a specific gNB-CU-UP 260 may be based on the requested services, NSSAI, DNN, QoS requirements or whether they belong to the same PDU Session or have the same trust relationship with the application/service provider. The DRB Group Security ID indicates which DRBs apply to the same user plane security context. The DRB Group Security ID can otherwise be called as UP Security Indicator/UP Security Identifier and it is applicable for all relevant procedures described herein.

Also during Step 4, the gNB-CU-CP 255 derives the user plane security keys. In one embodiment, the UP security key derivation is according to the derivation option shown in FIG. 5A. In another embodiment, the UP security key derivation is according to the derivation option shown in FIG. 5B.

Figure 5A:
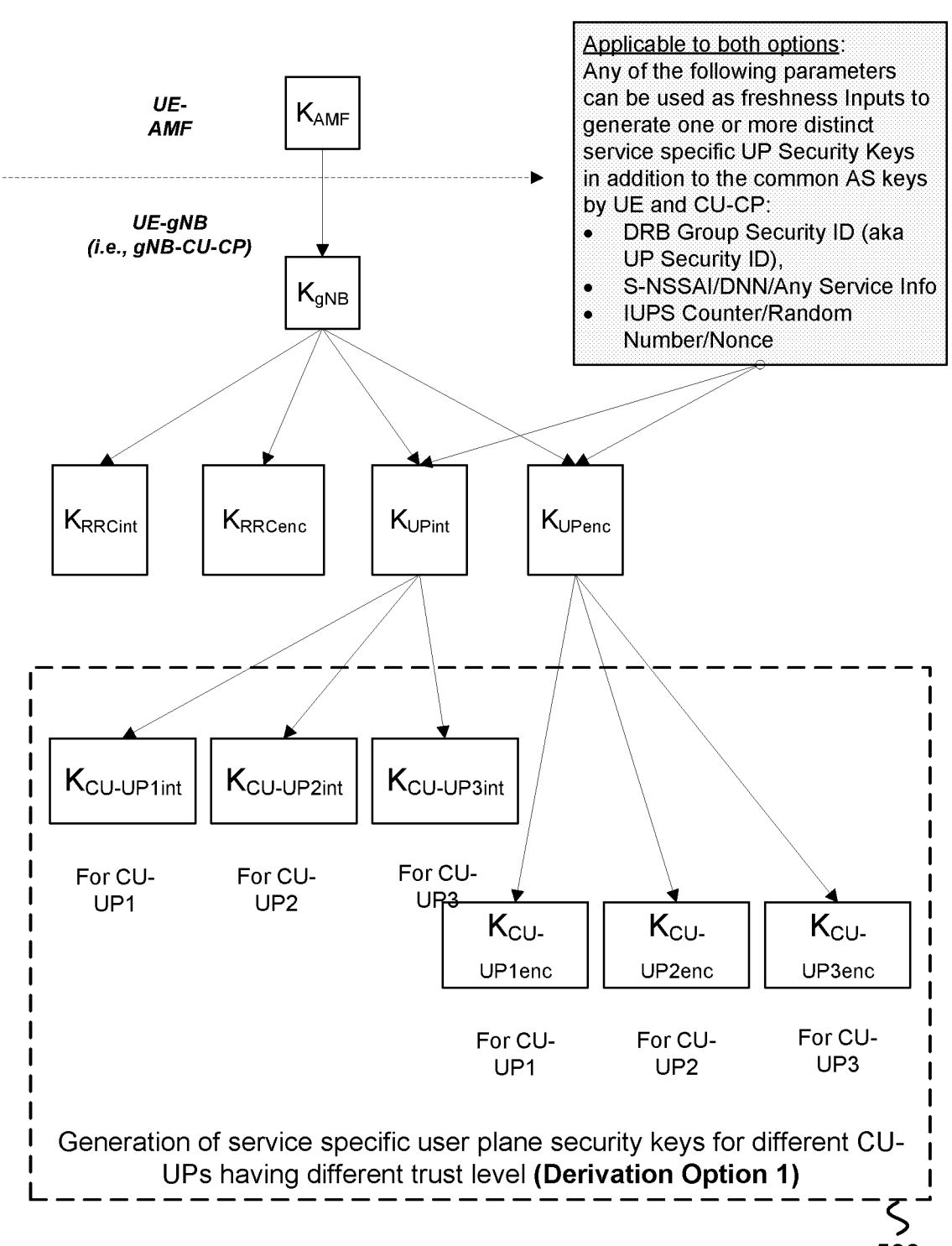
FIG. 5A is a diagram illustrating one embodiment of multiple distinct/independent User Plane Service (or gNB-CU-UP) specific Security Key generation.
Figure 5B:
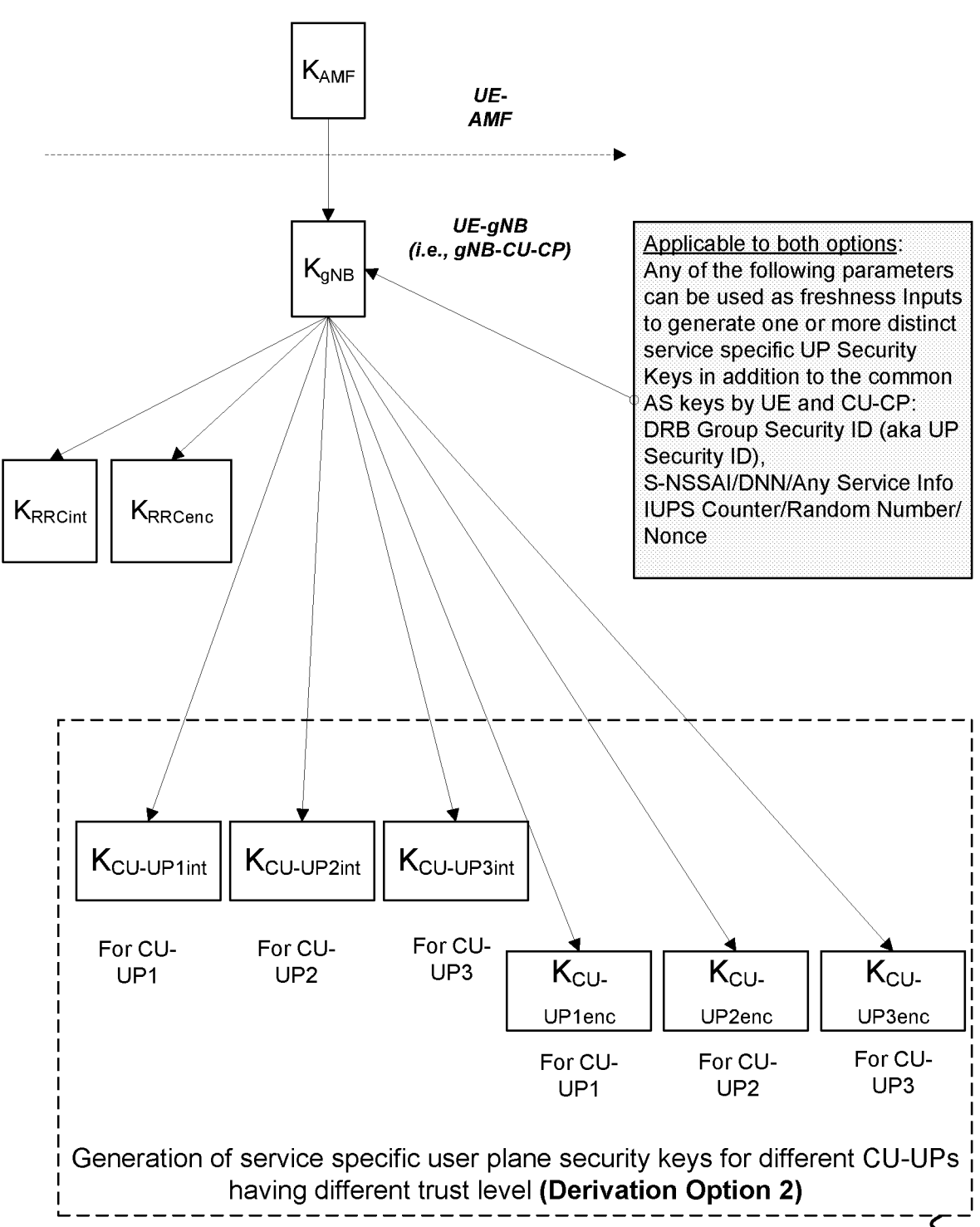
FIG. 5B is a diagram illustrating another embodiment of multiple distinct/independent User Plane Service (or gNB-CU-UP) specific Security Key generation.

FIGS. 5A-5B present two possible ways by which one or more dedicated/independent user plane integrity and ciphering protection key(s) can be derived to cover all scope of possible key derivation in this disclosure. Note, however, that the operator can implement only one of the key derivation options given in FIGS. 5A-5B.

The distinct gNB-CU-UP specific keys ($K_{CU-UPint}$, $K_{CU-UPenc}$) can be derived by the gNB-CU-CP either from the existing common user plane keys ($K_{UPint}$ and $K_{UPenc}$) (Derivation Option 1, shown in FIG. 5A) or derived directly from the $K_{gNB}$ key (Derivation Option 2, shown in FIG. 5B) provided by the AMF 215 in the Initial Context Setup Request message and the corresponding DRB Group Security ID (otherwise called as UP Security Indicator) is assigned by the gNB-CU-CP and DRB Group Security ID is stored along with the derived distinct UP Security context at its local memory.

Any one or more of the following Freshness Input Parameter(s) may be assigned by the gNB-CU-CP 255 and used in addition to the input Key in the independent/distinct UP key generation by the gNB-CU-CP 255 to ensure cryptographic separation between the multiple UP security contexts derived for the same UE 205 with different gNB-CU-UPs 260:

DRB Group Security ID,

Service Information (e.g., S-NSSAI/DNN/5QI),

Independent User Plane Security ("IUPS") Counter (i.e., IUPS-Counter): The IUPS-Counter is a counter handled by the gNB-CU-CP 255 and is initialized to 1 when an independent UP security is initiated by the gNB-CU-CP 255 for a UE 205 by selecting a gNB-CU-UP 260 belonging to the different security domain and derives the first independent (i.e., distinct) user plane security keys ($K_{CU-UPint}$ and $K_{CU-UPenc}$) from either the key $K_{gNB}$ or existing Common UP Security Keys ($K_{UPint}$ and $K_{UPenc}$). The IUPS-Counter is incremented by 1 whenever the gNB-CU-CP 255 initiates subsequent independent UP security for the same UE 205 by selecting another gNB-CU-UP 260 belonging to the different security domain and derives its subsequent independent user plane security keys ($K_{CU-UPint}$ and $K_{CU-UPenc}$);

IUPS Random Number (i.e., "IUPS Rand") is a random number assigned by gNB-CU-CP 255 for deriving distinct UP security context; and/or IUPS-Nonce, is a Nonce, where it is an arbitrary number that can used only once is assigned by gNB-CU-CP 255 for deriving distinct UP security context.

FIG. 5A shows a first UP Security Key derivation 500 performed by UE 205 and gNB-CU-CP 255 (i.e., to introduce cryptographic separation between user plane traffic of same UE to different gNB-CU-UPs), referred to as "Derivation Option 1". According to Derivation Option 1, the key $K_{CU-UPint}$ is derived using a Key Derivation Function ("KDF") as KDF ($K_{UPint}$, Freshness Input Parameter, Size/Length of Freshness Input Parameter) and the key $K_{CU-UPenc}$ is derived as KDF ($K_{UPenc}$, Freshness Input Parameter, Size/Length of Freshness Input Parameter).

FIG. 5B shows a second UP Security Key derivation 501 performed by UE 205 and gNB-CU-CP 255 (i.e., to introduce cryptographic separation between user plane traffic of same UE to different gNB-CU-UPs), referred to as "Derivation Option 2". According to Derivation Option 2, the key $K_{CU-UPint}$ is derived as KDF ($K_{gNB}$, Freshness Input Parameter, Size/Length of Freshness Input Parameter) and the key $K_{CU-UPenc}$ is derived as KDF ($K_{gNB}$, Freshness Input Parameter, Size/Length of Freshness Input Parameter).

In another option (not depicted in FIGS. 5A-5B), the UE 205 and gNB-CU-CP 255 each derive a key $K_{gNB}^{*}$ per gNB-CU-UP 260 (similar to vertical and horizontal gNB key derivation) and derives the independent user plane security keys ($K_{CU-UPint}$ and $K_{CU-UPenc}$) from the key $K_{gNB}^{*}$.

Returning to FIG. 4A, at Step 5, the gNB-CU-CP 255 sends the Bearer Context Setup Request message to each selected gNB-CU-UP 260 (see messaging 411). Here, the Bearer Context Setup Request message contains the freshly derived gNB-CU-UP specific UP integrity and confidentiality protection keys (i.e., $K_{CU-UPint}$ and $K_{CU-UPenc}$), the DRB Group ID/UP Security Indicator (to uniquely identify the UP Security Context of gNB-CU-UP), any of user plane security separation/freshness input parameter (IUPS-Counter/RAND/Nonce if need to be used in ciphering and integrity protection if need to be used in ciphering and integrity protection), the UE Security Capabilities, and UP Security Policy. In some embodiments, the Bearer Context Setup Request message also contain additional information, e.g., CN N3 tunnel termination (e.g., UPF ID/address), QFI(s)/5QI(s), QoS profile (including traffic filter(s)), etc. Each selected gNB-CU-CP 255 stores its assigned DRB Group Security ID/UP Security Indicator, the DRB ID, the gNB-CU-UP ID, and the freshly derived gNB-CU-UP specific keys ($K_{CU-UPint}$, $K_{CU-UPenc}$) as part of the distinct UP Security in its local memory.

Alternatively, if the gNB-CU-CP 255 knows the gNB-CU-UP specific Security capabilities, e.g., based on third party Application Service provider requirement for user plane security, then the gNB-CU-CP selects the highest priority user plane confidentiality and integrity algorithms considering the UE Security capabilities and gNB-CU-UP Security capabilities. In such embodiments, the gNB-CU- CP 255 additionally sends the selected UP security algorithm IDs to the selected gNB-CU-UP 260 in the Bearer Context Setup Request message. Note that in this alternative case, the gNB-CU-CP 255 need not send the UE Security Capabilities to the gNB-CU-UP 260 because the UP security algorithm selection happens already at the gNB-CU-CP 255.

At Step 6, each selected gNB-CU-UP 260 locally stores the received UP integrity and confidentiality protection keys ($K_{CU-UPint}$ and $K_{CU-UPenc}$) and DRB ID, along with DRB Group ID/UP Security Indicator (see block 413). If the Bearer Context Setup Request message contains UE Security Capabilities, then the UP security algorithm selection happens at the gNB-CU-UP 260. Here, the gNB-CU-UP 260 selects the available highest priority user plane confidentiality and integrity algorithm for the user plane protection based on the UE Security Capabilities and its own Security Capabilities.

Alternatively, if the selected gNB-CU-UP 260 receives the UP security algorithms instead of UE Security Capabilities from the gNB-CU-CP 255, then the gNB-CU-UP 260 locally stores the received UE security (e.g., integrity and ciphering) algorithms for its subsequent use.

With reference to FIG. 4B, at Step 7, the gNB-CU-UP 260 sends a Bearer Context Setup Response containing Selected User Plane Confidentiality and Integrity protection algorithms and the UP integrity and encryption indications (determined based on received and local UP security policy) (see messaging 415).

At Steps 8a-8b, after the successful Bearer Context Setup the gNB-CU-CP 255 sends an AS Security Mode Command to the UE 205, including the DRB Group Security ID(s)/UP Security Indicator(s), Selected User Plane Confidentiality and Integrity protection algorithm(s) for the independent/distinct UP security along with the existing common UP and RRC Algorithms (see messaging 417-419). The DRB Group ID/UP Security Indicator helps to differentiate each distinct UP security algorithms from the common UP encryption and integrity algorithms. Which DRB belongs to which DRB Group Security ID/UP Security Indicator with the corresponding algorithms is indicated in a subsequent RRC Reconfiguration Request. Note that as a precondition to Step 8a, the gNB-CU-CP 255 previously performs Access Stratum ("AS") Security Mode Command ("SMC") procedure during an initial context setup between the UE 205 and the gNB (i.e., to activate an initial $K_{gNB}$ at RRC_IDLE to RRC_CONNECTED state transition).

At Steps 9a-9b, the gNB-CU-CP 255 further activates the independent user plane security (integrity and ciphering/confidentiality protection activation) as part of DRB addition procedure (to the gNB-CU-UP belonging to different security domain) using the RRC Connection Reconfiguration Procedure with the UE. At Step 9a, the gNB-CU-CP 255 sends the RRC Connection Reconfiguration Request message to the UE for independent UP security activation (see messaging 421).

Here, the RRC Reconfiguration message contains DRB Group Security ID/UP Security Indicator per DRB (i.e., to let the UE know what UP Security need to be applied for a DRB security and to group all DRBs from the UE that need to apply the same UP security, as that can be destined towards a specific gNB-CU-UP (belonging to a different security domain than the operator controlled one)), Enable UP Security Separation Indication (i.e., sent only if a new distinct/independent UP Security derivation need to be triggered for a corresponding DRB at UE), any one freshness input parameter used by the gNB-CU-CP for distinct UP Security key (integrity and ciphering keys) generation (i.e., this IE is sent only if 'Enable UP Security Separation indication is sent'), Service Information, and the selected UP ciphering and integrity protection algorithms (if not provided already in the AS SMC) and UP integrity and encryption indication.

Note that the freshness input parameter can be UP security cryptographic separation Service Information (e.g., S-NS-SAI/DNN/5QI), IUPS-Counter, IUPS Rand and/or IUPS-Nonce). One or more DRBs can have the same DRB Group Security ID/UP Security Indicator as determined by the gNB-CU-CP and all UP messages related to those DRBs applies the same UP Security indicated by the UP Security Indicator. In one embodiment, the gNB-CU-CP 255 sends the parameters per gNB-CU-UP in individual RRC Connection Reconfiguration Requests. In another embodiment, the gNB-CU-CP 255 sends the parameters aggregated in one RRC Connection Reconfiguration Request.

At Step 9*b*, if the UE 205 successfully verifies integrity of the RRC Connection Reconfiguration message, then the UE 205 sends the RRC Connection Reconfiguration Complete message to the gNB-CU-CP with the UP Security Activation Success Indication and UP Security Indicator (see messaging 423).

If UP integrity protection is activated for DRBs as indicated in the RRC Connection Reconfiguration message, and if the gNB-CU-CP 255 provided 'Enable UP Security Separation Indication', then the UE 205 can generate distinct/independent user plane integrity and confidentiality protection keys ($K_{CU-UPint}$ and $K_{CU-UPenc}$) similar to the gNB-CU-CP 255 using any of the options described above with reference to FIG. 5A-5B, i.e., using the DRB Group Security ID and/or freshness input parameter provided by the gNB-CU-CP 255. The UE 205 locally stores the freshly generated distinct UP keys ($K_{CU-UPint}$ and $K_{CU-UPenc}$) and DRB ID (if provided by the gNB-CU-CP) along with the received DRB Group Security ID/UP Security Indicator.

If more than one DRBs have the same DRB Group Security ID/UP Security Indicator and no 'Enable UP Security Separation Indication' is sent during UP security activation as provided by the gNB-CU-CP 255, then the UE 205 stores only those DRB IDs along with the DRB Group Security ID/UP Security Indicator as part of the distinct/independent UP security context and applies the distinct UP security context corresponding to the UP Security Indicator which is already created and stored at the UE side. The UP integrity protection for such DRBs having same DRB Group Security ID shall start at the UE 205 using $K_{CU-UPint}$. Similarly, if UP ciphering is activated for DRBs as indicated in the RRC Connection Reconfiguration message, the UP ciphering for such DRBs with same DRB Group Security ID shall start at the UE using $K_{CU-UPenc}$.

If UP integrity protection is activated for DRBs as indicated in the RRC Connection Reconfiguration message, and if the gNB-CU-CP 255 does not provide 'Enable UP Security Separation Indication', then the UE 205 identifies and fetches the related distinct UP security context locally stored already (i.e., based on the DRB Group Security ID/UP Security Indicator) and performs integrity and ciphering protection of corresponding DRBs.

Similarly, the activation of integrity and ciphering can start at the UE 205 for all other DRBs based on specific DRB Group Security ID/UP Security Indicator as indicated by the gNB-CU-CP 255 accordingly with the corresponding UP integrity and ciphering keys ($K_{CU-UP-xint}$ and $K_{CU-UP-xenc}$).

Note that at UE side, the UE 205 uses the UP Security Indicator to uniquely identify a distinct UP security context to protect the UP message packets belonging to a DRB as indicated by the gNB-CU-CP 255 in RRC Reconfiguration message. If the distinct UP security context is already available for a UP Security Indicator, then the UE 205 uses UP Security Indicator to uniquely identify the distinct UE security context stored locally at the UE 205.

At Step 10*a*, the UE 205 verifies the RRC Connection Reconfiguration message (see block 425). If successful, then:

If independent UP integrity protection is activated for DRBs belonging to a DRB Group Security ID as indicated in the RRC Connection Reconfiguration message, and if the UE 205 does not have $K_{CU-UPint}$, then the UE 205 generates $K_{CU-UPint}$ as described above and the UE 205 starts independent UP integrity protection for such DRBs belonging to the specific DRB group ID, as described in step 9*b*.

Similarly, if independent UP ciphering is activated for DRBs belonging to a DRB Group Security ID as indicated in the RRC Connection Reconfiguration message, and if the UE 205 does not have $K_{CU-UPenc}$, then the UE 205 generates $K_{CU-UPenc}$ as described in above and the UE 205 starts UP ciphering for such DRBs belonging to the specific DRB group ID, as described in step 9*b*.

In one embodiment, if the DRB Group Security ID/UP Security takes the format: [Service ID|NG RAN assigned AN Nonce] (where the symbol '|' denotes concatenation), then the gNB-CU-CP 255 skips sending the service ID to the UE 205.

At Step 10*b*, if the gNB-CU-CP 255 receives the RRC Reconfiguration Complete message with UP Security success indication along with UP Security Indicator, the gNB-CU-CP 255 activates UP ciphering and integrity protection at the corresponding gNB-CU-UP 260 by sending the DRB Group Security ID/UP Security Indicator and a UP Security Activation Successful Indication to the gNB-CU-UP 260 (see block 427).

If UP integrity protection is activated for DRBs as indicated in the RRC Connection Reconfiguration message, then the UP integrity protection for such DRBs (marked with indicated DRB Group Security ID) can start at the gNB (i.e., gNB-CU-UP 260) using specific $K_{CU-UPint}$. Similarly, if UP ciphering is activated for DRBs as indicated in the RRC Connection Reconfiguration message, then the UP ciphering for such DRBs (marked with indicated DRB Group Security ID) can start at the gNB (i.e., gNB-CU-UP 260) using specific $K_{CU-UPenc}$.

Regarding the Cryptographic Separation in UP Confidentiality Mechanism, the DRB Group Security ID (can be between 3-6 bits) assigned by the access network (i.e., gNB-CU-CP 255) and/or any freshness input (such as Nonce and/or RandomNumber and/or Counter assigned and provided by gNB-CU-CP 255) can be used as an input parameter by the UE 205 and gNB 210 to the user plane confidentiality protection algorithm in addition to the message packet, 5-bit bearer identity, 1-bit direction value, 32-bit PDCP Count.

Regarding the Cryptographic Separation in UP Integrity Mechanism, the DRB Group Security ID (can be between 3-6 bits) assigned by the access network (i.e., gNB-CU-CP 255) and/or any freshness input (such as Nonce and/or RandomNumber and/or Counter assigned and provided by gNB-CU-CP 255) can be used as an input parameter by the UE 205 and gNB 210 to the user plane integrity protection algorithm in addition to the message packet, 5-bit bearer identity, 1-bit direction value, 32-bit PDCP Count.

Figure 6:
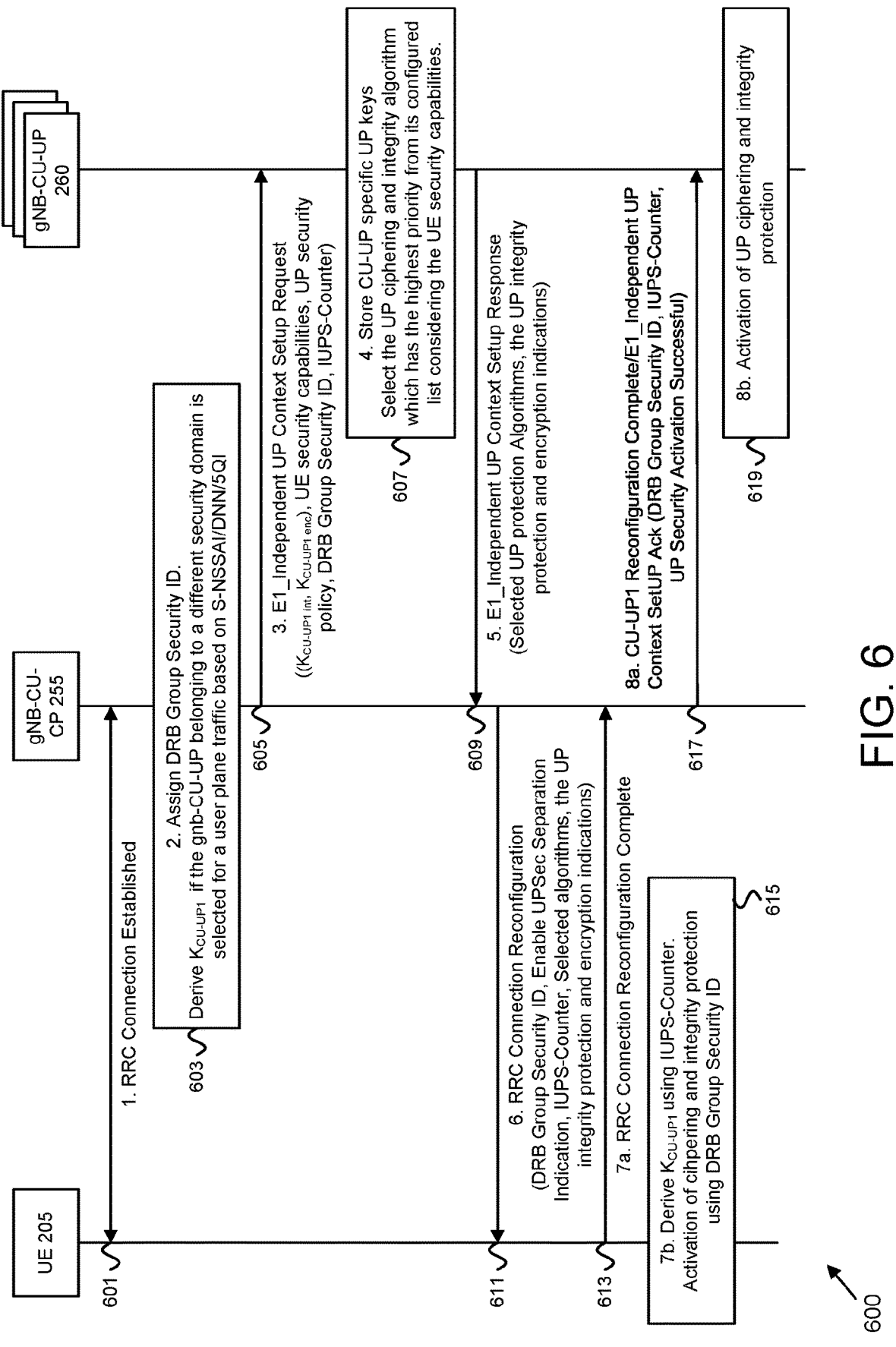
FIG. 6 is a diagram illustrating one embodiment of a procedure for multi-UP security setup during DRB Addition/Modification.

FIG. 6 depicts a second procedure 600 for multi-user plane security, according to embodiments of the disclosure. This figure represents a second option (Setup Option 2) for Multi-UP Security setup according to the first solution. The second procedure 400 depicts Multi-UP Security setup during Initial UE Context Setup at 5G-NR using a new E1 Independent UP Context Setup/Addition Procedure (DC Based Solution). The second procedure 600 is performed by the 5G-NR when a UE 205 is in Connected state and uses already at least one DRB and the 5G NR performs DRB addition procedure to add DRBs for the UE 205 based on a UE Service Request.

The proposed E1 Independent UP Context Setup/DRB Addition Procedure is initiated by the gNB-CU-CP 255 and is used to establish independent UE context at the gNB-CU-UP 260 in order to provide cryptographic separation in user plane security to the DRBs established with a UE 205 for a specific service controlled by a third party application service provider or if the selected gNB-CU-UP 260 for the new DRB, belongs to a different security domain. The procedure 600 may also be used to configure an gNB-CU-UP 260 terminated DRBs when the gNB-CU-UP 260 has different security requirements or belongs to a different security domain.

For every independent UP Context Setup initiation required during a DRB addition to a new gNB-CU-UP 260, the gNB-CU-CP 255 assigns a DRB Group Security ID/UP Security Indicator for the DRBs terminating at the same gNB-CU-UP 260 and in addition maintains a freshness input parameter to derive a gNB-CU-UP specific key, e.g., as described above with reference to FIGS. 5A-5B. Note that the Freshness Input Parameter(s) may be any one of the following:

DRB Security Group ID (can also be called as UP Security Indicator),

Service Information (e.g., S-NSSAI/DNN/5QI),

IUPS-Counter: The IUPS-Counter is a counter handled by the gNB-CU-CP 255 and is initialized to 1 when an independent UP security is initiated by the gNB-CU-CP 255 for a UE 205 by selecting a gNB-CU-UP 260 belonging to the different security domain and derives the first independent user plane security keys ($K_{CU-UPint}$ and $K_{CU-UPenc}$) from either the $K_{gNB}$ or existing Common UP Security Keys ($K_{UPint}$ and $K_{UPenc}$). The IUPS-Counter is incremented by 1 whenever the gNB-CU-CP 255 initiates subsequent independent UP security for the same UE 205 by selecting another gNB-CU-UP 260 belonging to the different security domain and derives its fresh independent user plane security keys ($K_{CU-UPint}$ and $K_{CU-UPenc}$) using any one of the derivation options described above with reference to FIGS. 5A-5B.

IUPS-Rand; and/or

IUPS-Nonce

When executing the procedure for adding subsequent data radio bearer(s) ("DRBs") to the same gNB-CU-UP 260 based on DRB service information such as (S-NSSAI/DNN/5QI), the gNB-CU-CP 255, for each new data radio bearer, may include the same DRB Security Group ID/UP Security Indicator which was assigned by the gNB-CU-CP 255 (in addition to the individual DRB ID) during the initial DRB setup with the same gNB-CU-UP 260 to group all DRBs terminating at the same gNB-CU-UP 260 (which belongs to a different security domain than the operator security domain) and to apply same UP security to all DRBs terminating in the same gNB-CU-UP 260.

The procedure 600 for distinct/Independent CU-UP specific UP Context Setup during DRB Addition Procedure involves the following steps:

At Step 1, the UE 205 and the (NG-RAN) gNB-CU-CP 255 establish the RRC connection (see messaging 601).

At Step 2, if the gNB-CU-CP 255 selects a gNB-CU-UP 260 belonging to a different security domain or operated/controlled by a third party application service provider having a less trust level than the operator controlled gNB-CU-UPs 260, then the gNB-CU-CP 255 determines to initiate an independent/distinct UP Context Setup with that specific gNB-CU-UP 260 (see block 603). If the gNB-CU-CP 255 receives Service information (e.g., S-NSSAI/DNN/5QI), then the selection of the gNB-CU-UP 260 can be based on service information received.

Note that if the UE 205 does not support multiple UP security as indicated in the MUPS parameter of the UE context, e.g., provisioned to the gNB-CU-CP 255 at initial context setup, then the gNB-CU-CP 255 does not activate any UP resources that require a different security context.

The gNB-CU-CP 255 then derives the distinct user plane security keys ($K_{CU-UPint}$, $K_{CU-UPenc}$), e.g., as described above with reference to FIGS. 5A-5B. The gNB-CU-UP specific keys ($K_{CU-UPint}$, $K_{CU-UPenc}$) can be derived by the gNB-CU-CP 255 either from the existing common user plane keys ($K_{UPint}$ and $K_{UPenc}$) (e.g., according to Derivation Option 1) or derived directly from the $K_{gNB}$ key (e.g., according to Derivation Option 2).

Any one or more of the following freshness input parameters can be used in addition to the input Key in the independent user plane key generation by the gNB-CU-CP 255 as mentioned above in this section. Further, the gNB-CU-CP 255 assigns a DRB Group Security ID to identify the freshly derived gNB-CU-UP specific keys ($K_{CU-UPint}$, $K_{CU-UPenc}$) and to indicate the set of DRBs that can be terminated with the selected specific gNB-CU-UP 260 for a UE service and share the same distinct/independent CP/UP specific UP security context. The gNB-CU-CP 255 stores the assigned DRB Group Security ID/UP Security Indicator/UP Security ID, DRB ID, gNB-CU-UP ID, freshly derived gNB-CU-UP specific keys ($K_{CU-UPint}$, $K_{CU-UPenc}$) as part of the distinct UP Security in its local memory.

At Step 3, the gNB-CU-CP 255 sends the E1_Independent UP Context Setup Request message to the selected gNB-CU-UP 260 (see messaging 605). Here the UP Context Setup Request message contains the freshly derived user plane keys ($K_{CU-UPint}$, $K_{CU-UPenc}$), the UE security capabilities, a UP security policy, the newly assigned DRB Group Security ID/UP Security Indicator, and any of user plane security separation/freshness input parameter (IUPS-Counter/RAND/Nonce if need to be used in ciphering and integrity protection). Alternatively, instead of the E1_Independent UP Context Setup Request message, the gNB-CU-CP 255 may use a E1 DRB Addition/Modification Request in step 3, for the similar purpose with the above described contents.

At Step 4, the gNB-CU-UP 260 stores the received CU-UP specific UP keys ($K_{CU-UPint}$, $K_{CU-UPenc}$), DRB ID, and DRB Group Security ID in its local memory (see block 607). Further, the gNB-CU-UP 260 selects the UP ciphering and integrity algorithm which has the highest priority from its configured list considering the UE security capabilities provided by the gNB-CU-CP 255 and stores these along with the received DRB Group Security ID/UP Security Indicator.

Alternatively, if the gNB-CU-CP 255 knows the gNB-CU-UP Security capabilities for user plane security (e.g., based on third party Application Service provider requirement), then the gNB-CU-CP 255 may select the highest priority UP confidentiality and integrity algorithms—considering the UE Security capabilities and gNB-CU-UP Security capabilities—and in addition send the UP security algorithm IDs to the gNB-CU-UP 260. In this alternative case, the gNB-CU-CP 255 need not send the UE Security Capabilities to the gNB-CU-UP 260 as the UP security algorithm selection happens at the gNB-CU-CP 255.

In this alternative case, the gNB-CU-UP 260 locally stores the selected UP integrity and ciphering algorithm IDs along with the DRB Group Security ID/UP Security Indicator. Further, the gNB-CU-UP 260 determines the UP integrity protection and encryption indications, e.g., based on local policy and/or UP security policy provided by the gNB-CU-CP 255.

At Step 5, the gNB-CU-UP 260 sends to the gNB-CU-CP 255 an E1_Independent UP Context Setup Response message containing selected UP integrity and ciphering algorithm IDs (if UP security algorithm selection happens at the gNB-CU-UP 260), the UP integrity protection and encryption indications (see messaging 609). Alternatively, if a E1 DRB Addition/Modification Request message is received in step 3, then the gNB-CU-UP 260 may use E1 DRB Addition/Modification Response in step 5 instead of the E1_Independent UP Context Setup Response message, for the similar purpose with the above described contents.

At Step 6, the gNB-CU-CP 255 further activates the independent UP security (integrity and ciphering/confidentiality activation) as part of DRB addition procedure (to the gNB-CU-UP(s) 260 belonging to different security domain) using the RRC Connection Reconfiguration Procedure (see messaging 611).

Here, the RRC Connection Reconfiguration message for independent UP security activation sent from the gNB-CU-CP 255 to the UE 205 contains a DRB Group Security ID/UP Security Indicator per DRB (to let the UE know what UP Security need to be applied for a DRB security and to group all DRBs from the UE that need to apply the same UP security, as that can be destined towards a specific gNB-CU-UP belonging to a different security domain than the operator controlled one). The RRC Connection Reconfiguration message may also contain an Enable UP Security Separation Indication (i.e., sent only if a new distinct/independent UP Security derivation need to be triggered at UE), any one input parameter used by the gNB-CU-CP for distinct UP Security key (integrity and ciphering keys) generation and UP security cryptographic separation (e.g., IUPS-Counter, IUPS-Rand and/or IUPS-Nonce), Service Information (e.g., S-NSSAI/DNN/5QI), the selected UP ciphering and integrity protection algorithms, and UP integrity and encryption indication. Note that one or more DRBs may have the same DRB Group Security ID/UP Security Indicator as determined by the gNB-CU-CP 255.

In one embodiment, the gNB-CU-CP 255 sends the parameters per gNB-CU-UP in individual RRC Connection Reconfiguration Requests. In another embodiment, the gNB-CU-CP 255 sends the parameters aggregated in one RRC Connection Reconfiguration Request. In certain embodiments, the input freshness parameters are provided by the gNB-CU-CP 255 to UE 205 only if the Enable UP Security Separation Indication is sent.

If a DRB is added with a previously established DRB Group Security ID/UP Security Indicator, then no parameters for the key derivation or algorithm selection have to be transferred since the UE 205 can pick the same UP keys of the DRB(s) with the same DRB Group Security ID/UP Security Indicator.

At Step 7*a*, if UP integrity protection is activated for DRBs as indicated in the RRC Connection Reconfiguration message, and if the gNB-CU-CP provided 'Enable UP Security Separation Indication', then the UE 205 generates independent UP integrity and confidentiality protection keys (i.e., $K_{CU-UPint}$ and $K_{CU-UPenc}$) similar to the gNB-CU-CP 255 using any one of the above described derivation options and using the DRB Group Security ID and/or freshness input parameter provided by the gNB-CU-CP 255.

The UE 205 locally stores the freshly generated distinct UP keys ($K_{CU-UPint}$ and $K_{CU-UPenc}$) and DRB ID (if provided by the gNB-CU-CP 255) along with the received DRB Group Security ID/UP Security Indicator. If more than one DRBs have the same DRB Group Security ID/UP Security Indicator during UP security activation as provided by the gNB-CU-CP, then the UE 205 stores only those DRB IDs along with the DRB Group Security ID/UP Security Indicator as part of the distinct/independent UP security context. The UP integrity protection for such DRBs having same DRB Group Security ID starts at the UE 205 using $K_{CU-UPint}$. Similarly, if UP ciphering is activated for DRBs as indicated in the RRC Connection Reconfiguration message, the UP ciphering for such DRBs with same DRB Group Security ID starts at the UE 205 using $K_{CU-UPenc}$.

If UP integrity protection is activated for DRBs as indicated in the RRC Connection Reconfiguration message, and if the gNB-CU-CP 255 does not provide 'Enable UP Security Separation Indication', then the UE 205 identifies and fetches the related distinct UP security context already locally stored based on the DRB Group Security ID/UP Security Indicator. The UE 205 also performs integrity and ciphering protection of corresponding DRBs.

Similarly, the activation of integrity and ciphering can start at the UE 205 for all other DRBs having different DRB Group Security ID as indicated by the gNB-CU-CP 255 accordingly with the corresponding UP integrity and ciphering keys ($K_{CU-UP-xint}$ and $K_{CU-UP-xenc}$).

The UE 205 verifies the RRC Connection Reconfiguration message. If successful:

If independent UP integrity protection is activated for DRBs belonging to a DRB Group Security ID as indicated in the RRC Connection Reconfiguration message, and if the UE 205 does not have $K_{CU-UPint}$, then the UE 205 generates $K_{CU-UPint}$ as described above with reference to FIGS. 5A-5B and the UE 205 starts independent UP integrity protection for such DRBs belonging to the specific DRB group ID, as described in step 9*b* of FIG. 4B.

Similarly, if independent UP ciphering is activated for DRBs belonging to a DRB Group Security ID as indicated in the RRC Connection Reconfiguration message, and if the UE 205 does not have $K_{CU-UPenc}$, the UE 205 generates $K_{CU-UPenc}$ as described in FIG. 5 and the UE 205 starts UP ciphering for such DRBs belonging to the specific DRB group ID, as described in step 9*b* of FIG. 4B.

In one embodiment, if the DRB Group Security ID/UP Security takes the format: [Service ID|NG RAN assigned AN Nonce] (where the symbol '|' denotes concatenation), then the gNB-CU-CP 255 skips sending the service ID to the UE 205.

If the UE 205 successfully verifies integrity of the RRC Connection Reconfiguration message, then the UE 205 sends the RRC Connection Reconfiguration Complete message to the gNB-CU-CP 255 with a UP Security Activation Success Indication and the UP Security Indicator.

At Step 7b, if UP ciphering is activated for DRBs as indicated in the RRC Connection Reconfiguration message, then the UP ciphering for such DRBs (marked with indicated DRB Group Security ID) can start at the gNB (i.e., gNB-CU-UP 260) using specific $K_{CU-UPenc}$ (see block 615).

Note that at the UE side, the UE 205 uses the UP Security Indicator to uniquely identify a distinct UP security context to protect the UP message packets belonging to a DRB as indicated by the gNB-CU-CP 255 in RRC Reconfiguration message. If the distinct UP security context is already available for a UP Security Indicator, then the UE 205 uses UP Security Indicator to uniquely identify the distinct UE security context stored locally at the UE 205.

At Step 8a, the gNB-CU-CP 255 if receives the RRC Reconfiguration Complete message with UP Security Activation Success Indication and UP Security Indicator, then the gNB-CU-CP 255 activates UP ciphering and integrity protection at the gNB-CU-UP 260 by sending the E1/CU-UP Reconfiguration Complete/E1_Independent UP Context Setup Ack message containing DRB Group Security ID and UP Security Activation Successful Indication to the gNB-CU-UP 260 (see messaging 617).

At Step 8b, if UP integrity protection is activated for DRBs as indicated in the RRC Connection Reconfiguration message, then the UP integrity protection for such DRBs (marked with indicated DRB Group Security ID) can start at the gNB (i.e., gNB-CU-UP) using specific $K_{CU-UPint}$ (see block 619).

Regarding the Cryptographic Separation in UP Confidentiality Mechanism, the DRB Group Security ID (can be between 3-6 bits) assigned by the access network (i.e., gNB-CU-CP 255) and/or any freshness input (such as Nonce and/or RandomNumber and/or Counter assigned and provided by gNB-CU-CP 255) can be used as an input parameter by the UE 205 and gNB 210 to the user plane confidentiality protection algorithm in addition to the message packet, 5-bit bearer identity, 1-bit direction value, 32-bit PDCP Count.

Regarding Cryptographic Separation in UP Integrity Mechanism, the DRB Group Security ID (can be between 3-6 bits) assigned by the access network (i.e., gNB-CU-CP 255) and/or any freshness input (such as Nonce and/or RandomNumber and/or Counter assigned and provided by gNB-CU-CP 255) can be used as an input parameter by the UE 205 and gNB 210 to the user plane integrity protection algorithm in addition to the message packet, 5-bit bearer identity, 1-bit direction value, 32-bit PDCP Count.

Note that the second procedure 400 can be also used for other scenarios, e.g., for the reactivation of DRBs or addition of DRBs. The same principles as described above apply.

Figure 7A:
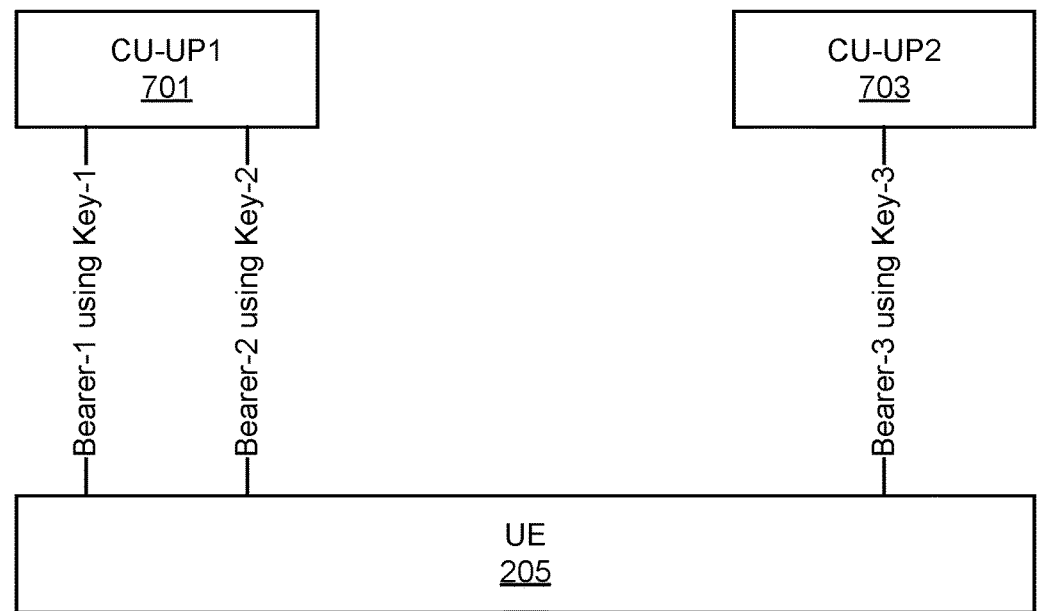
FIG. 7A is a diagram illustrating one embodiment of UP Security Setup with 5G-NR Topology Hiding.
Figure 7B:
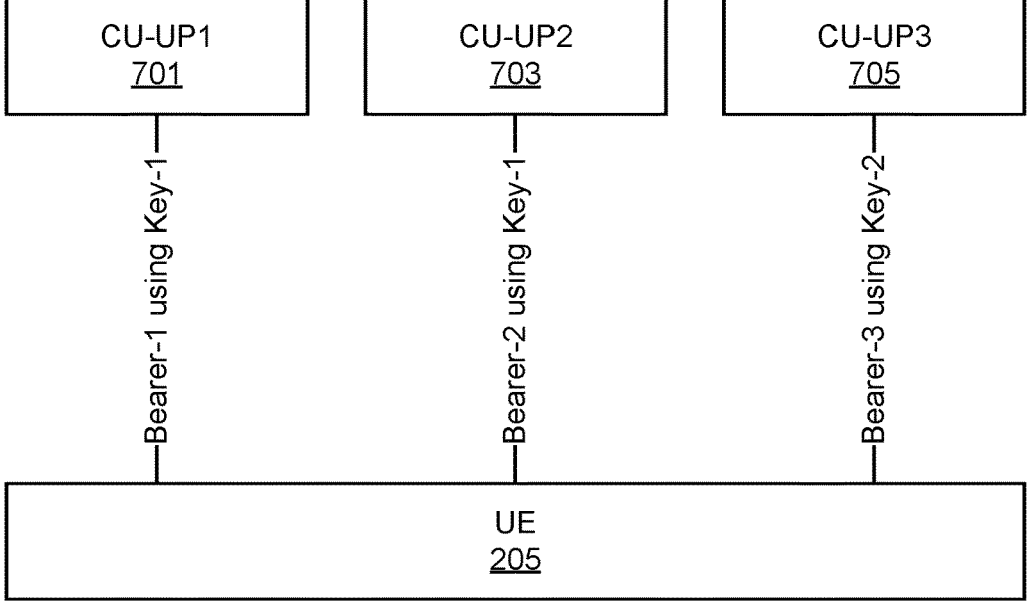
FIG. 7B is a diagram illustrating another embodiment of UP Security Setup with 5G-NR Topology Hiding.

According to a second solution, the different group of security keys one for each gNB-CU-CP 255 is kept transparent to the UE 205. Therefore, a UE 205 may not be required or even able to determine which DRBs are placed in which CU-CP element. The network architecture is thereby hidden to the UE 205. FIGS. 7A and 7B shows how 5G-NR topology hiding can be achieved.

One way to achieve 5G-NR topology hiding is to configure and reconfigure any DRB to use one of the existing Security contexts. Also, the network may even configure more than one security context for the (Data) Radio Bearer(s) terminating in the same CU-CP element. This could lead to 'm' security context being used for 'n' (Data) Radio Bearers, where 'm' can be less than or equal to or more than 'n.' A security context not in use may even be updated/refreshed/re-keyed if, for example, the next key upper in the hierarchy changes ($K_{gNB}$, $K_{AMF}$ or similar). The security context (key) generation happens as described in one of the preceding embodiment solutions.

FIG. 7A depicts a first scenario for UP Security Setup with 5G-NR Topology Hiding. In the depicted example, a first bearer ("Bearer-1") using a first key ("Key-1") and a second bearer ("Bearer-2") using a second key ("Key-2") are terminated at a first CU-UP element ("CU-UP1") 701, where the keys can be derived specific to the corresponding bearer accordingly. Additionally, a third bearer ("Bearer-3") using a third key ("Key-3") is terminated at a second CU-UP element ("CU-UP2") 703. However, this network architecture is hidden to the UE 205. Here, the UE 205 sees three bearers and uses separate keys without requiring knowing which bearer possibly terminates in which CU-UP element.

FIG. 7B depicts a second scenario for UP Security Setup with 5G-NR Topology Hiding. In the depicted example, a first bearer ("Bearer-1") using a first key ("Key-1") and a second bearer ("Bearer-2") also using the first key are terminated at a different CU-UP elements, i.e., CU-UP1 701 and CU-UP2 703. Additionally, a third bearer ("Bearer-3") using a second key ("Key-2") is terminated at a third CU-UP element ("CU-UP3") 705. However, this network architecture is hidden to the UE 205. Here, two bearers terminating in different gNB-CU-UPs, but bearers across CU-UP share same key and at the same time a vulnerable gNB-CU-UP uses its own key (not visible to the UE 205).

Figure 8:
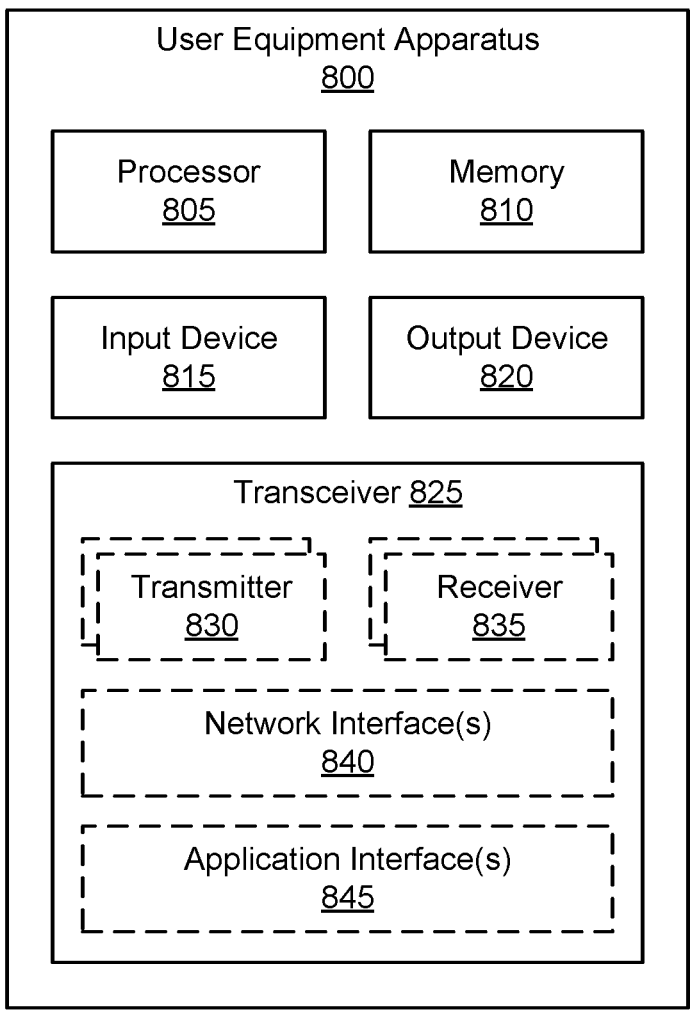
FIG. 8 is a diagram illustrating one embodiment of a user equipment apparatus that may be used for setting up multiple UP security contexts.

FIG. 8 depicts a user equipment apparatus 800 that may be used for multi-UP security setup, according to embodiments of the disclosure. In various embodiments, the user equipment apparatus 800 is used to implement one or more of the solutions described above. The user equipment apparatus 800 may be one embodiment of the remote unit 105 and/or the UE 205, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panel supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 controls the user equipment apparatus 800 to implement the above described UE behaviors. For example, via the transceiver 825 the processor 805 may send UE Capabilities for support of multiple UP security contexts to the network (i.e., to AMF) in a NAS message. The transceiver 825 further receives an AS SMC message from a CU-CP node in a RAN (i.e., gNB-CU-CP 255) and receives at least one RRC Reconfiguration message from the CU-CP node to activate distinct/independent UP security at the UE for specific DRBs.

Here, the AS SMC message contains a UP Security Indicator (also referred to as a UP Security ID or DRB Group Security ID) and related UP Protection algorithms (i.e., Ciphering and Integrity algorithms for distinct UP Security). Note that the AS SMC message may also contain Common RRC and UP security algorithms. Moreover, the RRC Reconfiguration message(s) (each) contain the UP Security Indicator, an Enable UP Security Separation Indication, at least one Freshness parameter and UP security indications (e.g., UP Security integrity and Ciphering indications). In certain embodiments, the UP security indication may contain conventional UP security information.

Note that the SMC message and the RRC Reconfiguration message(s) may contain the same or different freshness parameter(s) depending on the UP termination point selected for the UE's UP traffic. Where the same CU-UP is selected, the freshness parameter(s) will be the same. However, where different CU-UPs are selected, the freshness parameter(s) will be different. In various embodiments, the at least one Freshness parameter contains one or more of: a nonce, a random number, a counter, a S-NSSAI, a DNN and a 5QI parameter.

The processor 805 derives distinct UP integrity and ciphering keys ($K_{CU\text{-}UPint}$ and $K_{CU\text{-}UPenc}$) using a KDF and controls the transceiver 825 to sends a UP Security Activation Success Indication along with the UP Security Indicator in RRC Connection Reconfiguration Complete Message to the CU-CP node. In some embodiments, the processor 805 derives the distinct UP integrity and ciphering keys (i.e., $K_{CU\text{-}UPint}$ and $K_{CU\text{-}UPenc}$) using a RAN node key (i.e., $K_{gNB}$) as an input key and using the UP Security Indicator, a length of the UP Security Indicator, the at least one Freshness parameter, and a length of the input as an additional input to the KDF.

In some embodiments, the processor 805 derives the distinct UP integrity and ciphering keys (i.e., $K_{CU\text{-}UPint}$ and $K_{CU\text{-}UPenc}$) in response to receiving an Enable UP Security Separation Indication in the RRC Reconfiguration message. In some embodiments, the processor 805 derives the distinct UP integrity key (i.e., $K_{CU\text{-}UPint}$) using a common UP integrity Key (i.e., $K_{UPint}$) as an input key and using the UP Security Indicator, a length of the UP Security Indicator, the at least one Freshness parameter, and a length of the at least one Freshness parameter as additional inputs to the KDF. In some embodiments, the processor 805 derives the distinct UP ciphering key (i.e., $K_{CU\text{-}UPenc}$) using a common UP ciphering Key (i.e., $K_{UPenc}$) as an input key and using the UP Security Indicator, a length of the UP Security Indicator, the at least one Freshness parameter, and a length of the at least one Freshness parameter as additional inputs to the KDF.

In some embodiments, the processor 805 stores the received UP Security Indicator, the at least one Freshness parameter, and UP Protection algorithms (e.g., Ciphering and Integrity algorithms) as part of the distinct UP Security context at the memory 810, e.g., after a successful AS SMC procedure. In such embodiments, the processor 805 uses the UP Security Indicator to uniquely identify the distinct UE security context stored locally at the UE. In various embodiments, the distinct UE security context contains the UP Security Indicator, the at least one Freshness parameter, the UP Protection algorithms (e.g., Ciphering and Integrity algorithms for distinct UP Security), UP integrity and ciphering keys (i.e., $K_{CU\text{-}UPint}$ and $K_{CU\text{-}UPenc}$), at least one DRB ID, and the UP security indications (e.g., UP Security integrity and Ciphering indications).

In some embodiments, the processor 805 further verifies the RRC Reconfiguration message and, in response to successful RRC Reconfiguration message verification, stores the (i.e., freshly derived) distinct UP integrity and ciphering keys ($K_{CU\text{-}UPint}$ and $K_{CU\text{-}UPenc}$) along with the UP Security Indicator and the at least one Freshness parameter as part of a distinct (i.e., independent) UP Security context at the memory 810. In certain embodiments, the processor 805 uses the UP Security Indicator to uniquely identify a distinct UP security context to protect UP message packets belonging to a DRB as indicated by the RRC Reconfiguration message.

In some embodiments, the processor 805 uses a UP message packet, the UP Security Indicator, a length of the UP Security Indicator, the at least one Freshness parameter, and a length of the at least one Freshness parameter inputs to the UP integrity protection algorithm, wherein the processor 805 uses the UP integrity Key (i.e., $K_{CU\text{-}UPint}$) corresponding to the UP Security Indicator for the UP integrity protection. In some embodiments, the processor 805 uses a UP message packet, the UP Security Indicator, a length of the UP Security Indicator, the at least one Freshness parameter, and a length of the at least one Freshness parameter as inputs to a UP encryption/confidentiality protection algorithm, and wherein the processor 805 uses the UP ciphering Key (i.e., $K_{CU\text{-}UPenc}$) corresponding to the UP Security Indicator for the UP confidentiality protection.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to setting up multiple UP security contexts. For example, the memory 810 may store various parameters, panel/beam configurations, resource assignments, policies, and the like as described above. In certain embodiments, the memory

810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
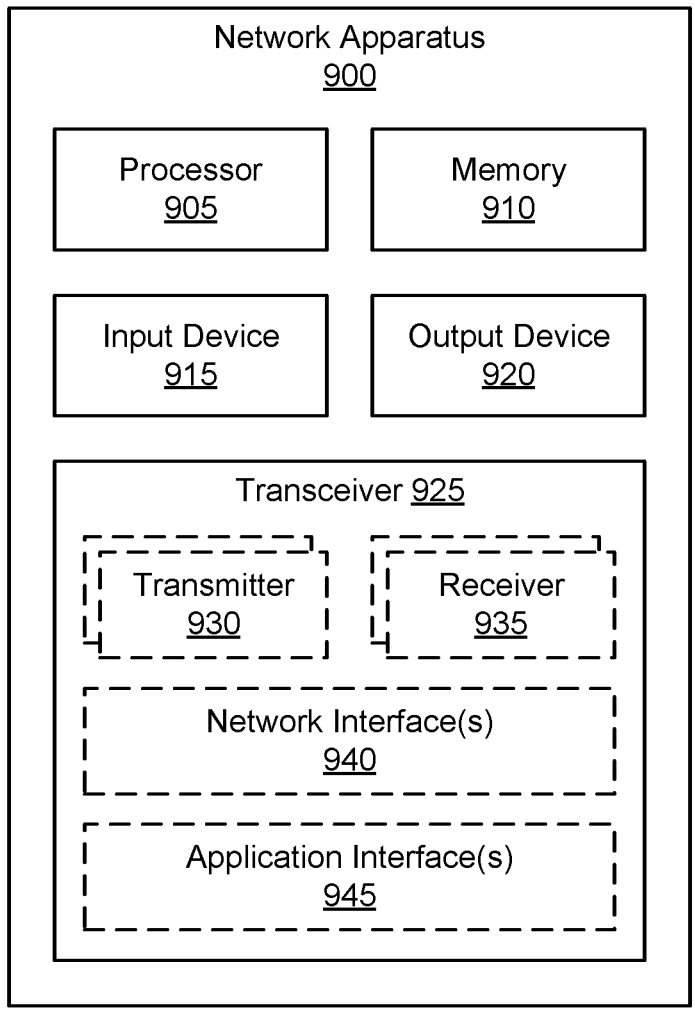
FIG. 9 is a diagram illustrating one embodiment of a network equipment apparatus that may be used for setting up multiple UP security contexts.

FIG. 9 depicts a network equipment apparatus 900 that may be used for setting up multiple UP security contexts, according to embodiments of the disclosure. In one embodiment, network equipment apparatus 900 may be one implementation of a RAN node, such as the base unit 121, the RAN node 210, or gNB, described above. Furthermore, the base network equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network equipment apparatus 900 may not include any input device 915 and/or output device 920. In various embodiments, the network equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the network equipment apparatus 900 is a RAN node (e.g., gNB) that sends UE configurations and receives measurement reports, as described herein. In such embodiments, the processor 905 controls the network equipment apparatus 900 to perform the above described behaviors. When operating as a RAN node, the processor 905 may include an application processor (also known as "main processor") which manages application-domain and operating system ("OS") functions and a base-band processor (also known as "baseband radio processor") which manages radio functions.

In various embodiments, the processor 905 controls the network apparatus 900 to implement the above described gNB-CU-UP behaviors. For example, the processor 905 may derive distinct UP integrity and ciphering keys (i.e., $K_{CU-UPint}$ and $K_{CU-UPenc}$) for a selected CU-UP node in the RAN, said derivation using a KDF. The processor 905 assigns a UP Security Indicator (also referred to as a UP Security ID or DRB Group Security ID) to uniquely identify the derived distinct UP integrity and ciphering keys (i.e., $K_{CU-UPint}$ and $K_{CU-UPenc}$) and the transceiver 925 sends a setup request to the selected CU-UP node, said setup request containing the UP Security Indicator and the distinct UP integrity and ciphering keys. As discussed herein, the setup request may also contain one or more freshness parameters to use in integrity and ciphering protection. Moreover, the transceiver 925 receives a setup response from the selected CU-UP node and the processor 905 activates distinct UP security at a UE.

In some embodiments, the processor 905 activates the distinct UP security at the UE by controlling the transceiver 925 to send an AS SMC message to the UE. Here, the AS SMC message may contain the UP Security Indicator, at least one Freshness parameter, selected UP Protection algorithms (i.e., Ciphering and Integrity algorithms). Note that the AS SMC message may also contain Common RRC and UP security algorithms. Moreover, the processor 905 independently activates UP security for a set of DRBs by sending an RRC Reconfiguration message per DRB to the UE. The RRC Reconfiguration message may contain the UP Security Indicator, an Enable UP Security Separation Indication, at least one Freshness parameter and UP security indications (e.g., UP Security integrity and Ciphering indications). In certain embodiments, the UP security indication may contain conventional UP security information.

Note that the SMC message and the RRC Reconfiguration message(s) may contain the same or different freshness parameter(s) depending on the UP termination point selected for the UE's UP traffic. Where the same CU-UP is selected, the freshness parameter(s) will be the same. However, where different CU-UPs are selected, the freshness parameter(s) will be different.

In some embodiments (e.g., when the UE is in Connected state and uses already at least one DRB), the processor 905 activates the distinct UP security at the UE by controlling the transceiver 925 to send an RRC Reconfiguration message to the UE, said RRC Reconfiguration message containing the UP Security Indicator, an Enable UP Security Separation Indication, at least one Freshness parameter, selected UP Protection algorithms (i.e., Ciphering and Integrity algorithms), and UP security indications (e.g., UP Security integrity and Ciphering indications). In certain embodiments, the UP security indication may contain conventional UP security information.

In some embodiments, the transceiver 925 further receives an RRC Connection Reconfiguration Complete Message from the UE, said RRC Connection Reconfiguration Complete Message containing an UP Security Activation Success Indication along with the UP Security Indicator. In such embodiments, the transceiver 925 sends a confirmation message (i.e., in any E1 message per Option 1; alternatively, a E1/CU-UP Reconfiguration Complete/ E1_Independent UP Context Setup Ack message per Option 2) to the selected CU-UP node to inform of the successful UP security activation, said confirmation message containing the UP Security Indicator and a UP Security Activation Success Indication.

In the above embodiments, the processor 905 derives the distinct UP keys (i.e., $K_{CU-UPint}$ and $K_{CU-UPenc}$) using a RAN node key (i.e., $K_{gNB}$) as an input key and using the UP Security Indicator, a length of the UP Security Indicator, at least one Freshness parameter, and a length of the at least one Freshness parameter as additional inputs to the KDF. Here, the at least one Freshness parameter contains one or more of: a nonce, a random number, a counter, a S-NSSAI, a DNN and a 5QI parameter (i.e., where each RRC Reconfiguration message per DRB also contains the at least one Freshness parameter used to derive the distinct UP keys).

In some embodiments, the processor 905 derives the distinct UP integrity key (i.e., $K_{CU-UPint}$) using a common UP integrity Key (i.e., $K_{UPint}$) as an input key and using the UP Security Indicator, a length of the UP Security Indicator, at least one Freshness parameter, and a length of the at least one Freshness parameter as additional inputs to the KDF. Moreover, the processor 905 derives the distinct UP ciphering key (i.e., $K_{CU-UPenc}$) using a common UP ciphering Key (i.e., $K_{UPenc}$) as an input key and using the UP Security Indicator, a length of the UP Security Indicator, at least one Freshness parameter, and a length of the at least one Freshness parameter as additional inputs to the KDF. In such embodiments, the at least one Freshness parameter contains one or more of: a nonce, a random number, a counter, a S-NSSAI, a DNN and a 5QI parameter.

In some embodiments, the transceiver 925 receives UE Service information from a Network Function (i.e., AMF or SMF). Here, the UE Service information contains at least one of S-NSSAI, DNN and 5QI parameters. In such embodiments, the processor 905 selects the CU-UP node based on the UE Service Information. In some embodiments, the transceiver 925 receives UE capabilities for support of multiple UP security contexts. In such embodiments, the processor 905 selects the CU-UP node based on the received UE capabilities.

In some embodiments, the processor 905 determines to derive a distinct UP security context with cryptographic separation from a common UP security context based on at least one of: a trust level of the selected CU-UP node, security domain information, a deployment location, and a local policy of the apparatus.

In some embodiments, the setup request message further contains a Security Capability of the UE. In such embodiments, the setup response message contains UP Protection algorithms selected by the CU-UP node based on the Security Capability of the UE and a Security Capability of the selected CU-UP node. As described above, the UP Protection algorithms may include Ciphering and Integrity algorithms.

In some embodiments, the transceiver 925 receives a Security Capability of the selected CU-UP node and the processor 905 performs UP ciphering and integrity algorithm negotiation and selection based on the Security Capability of the selected CU-UP node and also based on a Security Capability of the UE. In certain embodiments, the setup request message further contains the selected the UP ciphering and integrity algorithms.

In some embodiments, the processor 905 stores the assigned UP Security Indicator, at least one Freshness parameter, the corresponding freshly derived distinct UP integrity and ciphering keys (i.e., $K_{CU-UPint}$ and $K_{CU-UPenc}$), corresponding selected UP ciphering and integrity algorithms, UE ID, and an identity of the selected CU-UP node to the local memory 910. In certain embodiments, the processor 905 further stores an identity of the UE and at least one DRB identity (if any) to the local memory 910.

In various embodiments, the processor 905 controls the network apparatus 900 to implement the above described gNB-CU-CP behaviors. For example, via the transceiver 925 the processor 905 may receive a setup request message from a CU-CP node in the RAN (i.e., gNB-CU-CP), said setup request containing a UP Security Indicator (also referred to as a UP Security ID or DRB Group Security ID), UE Security Capabilities, and distinct UP integrity and ciphering keys. The processor 905 selects UP ciphering and integrity algorithms based on the received UE security capabilities. Via the transceiver 925, the processor 905 sends the selected UP ciphering and integrity algorithms to the CU-CP node (e.g., in any E1 message) and receives an UP Security Activation Success Indication along with the UP Security Indicator (e.g., in any E1 message) from the CU-CP node.

In some embodiments, selecting the UP ciphering and integrity algorithms based on the UE Security Capabilities includes both selecting a highest priority UP ciphering algorithm from a configured list of algorithms and selecting a highest priority UP integrity algorithm from the configured list of algorithms. In certain embodiments, the processor 905 stores the received UP Security Indicator, distinct UP integrity and ciphering keys ($K_{CU-UPint}$ and $K_{CU-UPenc}$), at least one Freshness parameter, UE Security Capabilities and the selected UP ciphering and integrity algorithms to local memory 910.

In some embodiments, the processor 905 activates UP integrity and ciphering protection in response to receiving the UP Security Activation Success Indication and UP Security Indicator from the CU-CP node. In certain embodiments, the processor 905 activates UP integrity and ciphering protection by applying the distinct UP integrity and ciphering keys (i.e., $K_{CU-UPint}$ and $K_{CU-UPenc}$) received from the CU-CP node for encryption and integrity protection of UP messages and/or of DRBs terminating at the gNB-CU-CP side.

In various embodiments, the setup request message further contains at least one Freshness parameter. In such embodiments, the at least one Freshness parameter contains one or more of: a nonce, a random number, a counter, a S-NSSAI, a DNN and a 5QI parameter. In some embodiments, the processor 905 uses a UP message packet, the UP Security Indicator, a length of the UP Security Indicator, the at least one Freshness parameter, and a length of the at least one Freshness parameter inputs to the UP integrity protection algorithm, where the UP integrity Key (i.e., $K_{CU-UPint}$) corresponding to the UP Security Indicator is used for the UP integrity protection.

In some embodiments, the processor 905 uses a UP message packet, the UP Security Indicator, a length of the UP Security Indicator, the at least one Freshness parameter, and a length of the at least one Freshness parameter as inputs to a UP encryption/confidentiality protection algorithm, where the UP ciphering Key (i.e., $K_{CU-UPenc}$) corresponding to the UP Security Indicator is used for the UP confidentiality protection.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to setting up multiple UP security contexts. For example, the memory 910 may store parameters, configurations, resource assignments, policies, and the like, as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the PLMN and/or RAN, as described herein. Although only one transmitter 930 and one receiver 935 are illustrated, the network equipment apparatus 900 may have any suitable number of transmitters 930 and receivers 935. Further, the transmitter(s) 930 and the receiver(s) 935 may be any suitable type of transmitters and receivers.

Figure 10:
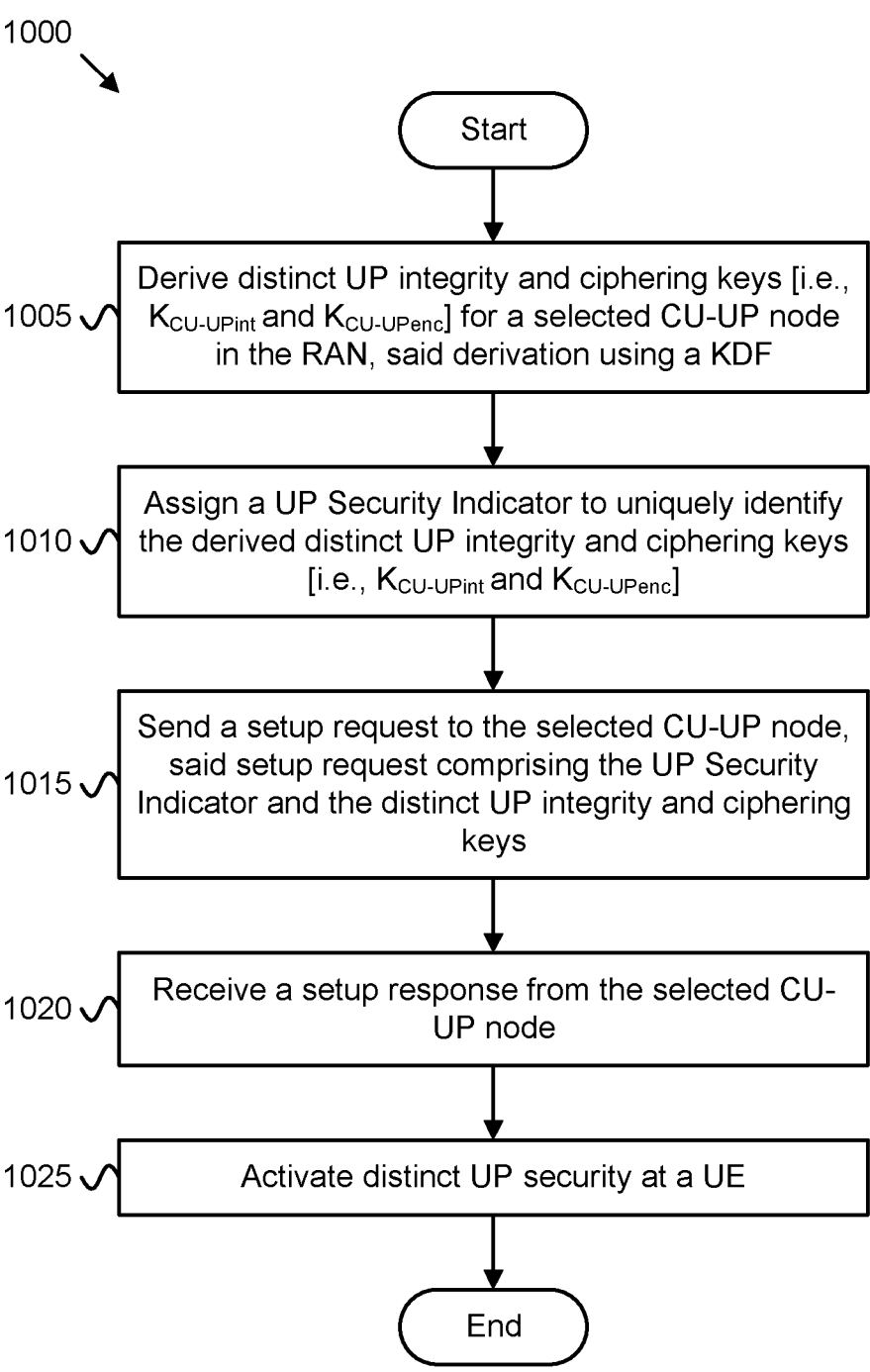
FIG. 10 is a flowchart diagram illustrating one embodiment of a first method for multi-UP security setup.

FIG. 10 depicts one embodiment of a method 1000 for setting up multiple UP security contexts, according to embodiments of the disclosure. In various embodiments, the method 1000 is performed by a RAN central unit control plane node in a mobile communication network, such as the base unit 121, the gNB-CU-CP 215, and/or the network apparatus 900, described above, described above. In some embodiments, the method 1000 is performed by a processor, such as a microcontroller, a microprocessor, a CPU, a GPU, an auxiliary processing unit, a FPGA, or the like.

The method 1000 begins and derives 1005 distinct UP integrity and ciphering keys for a selected CU-UP node in the RAN (e.g., gNB-CU-UP 260), said derivation using a KDF. The method 1000 includes assigning 1010 a UP Security Indicator to uniquely identify the derived distinct UP integrity and ciphering keys.

The method 1000 includes sending 1015 a setup request to the selected CU-UP node, said setup request comprising the UP Security Indicator and the distinct UP integrity and ciphering keys. The method 1000 includes receiving 1020 a setup response from the selected CU-UP node. The method 1000 includes activating 1025 distinct UP security at a UE. The method 1000 ends.

FIG. 11 depicts one embodiment of a method 1100 for setting up multiple UP security contexts, according to embodiments of the disclosure. In various embodiments, the method 1100 is performed by RAN central unit user plane node in a mobile communication network, such as the base unit 121, the gNB-CU-UP 220, and/or the network apparatus 900, described above, described above. In some embodiments, the method 1100 is performed by a processor, such as a microcontroller, a microprocessor, a CPU, a GPU, an auxiliary processing unit, a FPGA, or the like.

The method 1100 begins and receives 1105 a setup request message from a CU-CP node in the RAN (e.g., gNB-CU-CP 255), said setup request comprising a UP Security Indicator, UE Security Capabilities, and distinct UP integrity and ciphering keys. The method 1100 includes selecting 1110 UP ciphering and integrity algorithms based on the received UE security capabilities. The method 1100 includes sending 1115 the selected UP ciphering and integrity algorithms to the CU-CP node. The method 1100 includes receiving 1120 a UP Security Activation Success Indication along with the UP Security Indicator from the CU-CP node. The method 1100 ends.

FIG. 12 depicts one embodiment of a method 1200 for setting up multiple UP security contexts, according to embodiments of the disclosure. In various embodiments, the method 1200 is performed by a user equipment device in a mobile communication network, such as the remote unit 105, the UE 205, and/or the user equipment apparatus 800, described above. In some embodiments, the method 1200 is performed by a processor, such as a microcontroller, a microprocessor, a CPU, a GPU, an auxiliary processing unit, a FPGA, or the like.

The method 1200 begins and sends 1205 UE Capabilities for support of multiple UP security contexts to the network (i.e., to AMF) in a NAS message. The method 1200 includes receiving 1210 an AS SMC message from a CU-CP node in a RAN (e.g., gNB-CU-CP 255), said AS SMC message comprising a UP Security Indicator and related UP Protection algorithms (i.e., Ciphering and Integrity algorithms for distinct UP Security). The method 1200 includes receiving 1215 at least one RRC Reconfiguration message from the CU-CP node to activate distinct/independent UP security at the UE for specific DRBs, said at least one RRC Reconfiguration message comprising the UP Security Indicator, an Enable UP Security Separation Indication, and at least one Freshness parameter. The method 1200 includes deriving 1220 distinct UP integrity and ciphering keys (i.e., $K_{CU\text{-}UPint}$ and $K_{CU\text{-}UPenc}$) using a KDF. The method 1200 includes sending 1225 the UP Security Activation Success Indication along with UP Security Indicator in RRC Connection Reconfiguration Complete Message to the CU-CP node. The method 1200 ends.

Disclosed herein is a first apparatus for setting up multiple UP security contexts, according to embodiments of the disclosure. The first apparatus may be implemented by a RAN central unit control plane ("CU-CP") node in a mobile communication network, such as the base unit 121, the gNB-CU-CP 215, and/or the network apparatus 900, described above. The first apparatus includes a transceiver and a processor that derives distinct user plane ("UP") integrity and ciphering keys (i.e., $K_{CU\text{-}UPint}$ and $K_{CU\text{-}UPenc}$) for a selected central unit user plane ("CU-UP") node in the RAN, said derivation using a key derivation function ("KDF"). The processor assigns a UP Security Indicator (also referred to as a UP Security Identifier/DRB Security ID) to uniquely identify the derived distinct UP integrity and ciphering keys (i.e., $K_{CU\text{-}UPint}$ and $K_{CU\text{-}UPenc}$) and the transceiver sends a setup request to the selected CU-UP node, said setup request containing the UP Security Indicator and the distinct UP integrity and ciphering keys. The transceiver receives a setup response from the selected CU-UP node and the processor activates distinct UP security at a UE.

In some embodiments, activating the distinct UP security at the UE includes sending an Access Stratum ("AS") Security Mode Command ("SMC") message to the UE and independently activating UP security for a set of Data Radio Bearers ("DRBs") by sending at least one Radio Resource Control ("RRC") Reconfiguration message (i.e., per DRB) to the UE. Here, the AS SMC message may contain the UP Security Indicator, at least one Freshness parameter, selected UP Protection algorithms (i.e., Ciphering and Integrity algorithms for distinct UP Security). Moreover, the RRC Reconfiguration message may contain the UP Security Indicator, an Enable UP Security Separation Indication, and at least one Freshness parameter and UP security indications (e.g., Integrity and Ciphering indications).

In some embodiments, activating the distinct UP security at the UE includes sending an RRC Reconfiguration message to the UE, said RRC Reconfiguration message containing the UP Security Indicator, an Enable UP Security Separation Indication, at least one Freshness parameter, selected UP Protection algorithms (i.e., Ciphering and Integrity algorithms), and UP security indications (e.g., conventional UP security information).

In some embodiments, the transceiver further receives an RRC Connection Reconfiguration Complete Message from the UE, said RRC Connection Reconfiguration Complete Message containing an UP Security Activation Success Indication along with the UP Security Indicator. In such embodiments, the transceiver sends a confirmation message to the selected CU-UP node to inform of the successful UP security activation, said confirmation message containing the UP Security Indicator and a UP Security Activation Success Indication.

In the above embodiments, the processor derives the distinct UP keys (i.e., $K_{CU\text{-}UPint}$ and $K_{CU\text{-}UPenc}$) using a RAN node key (i.e., $K_{gNB}$) as an input key and using the UP Security Indicator, a length of the UP Security Indicator, at least one Freshness parameter, and a length of the at least one Freshness parameter as additional inputs to the KDF. Here, the at least one Freshness parameter contains one or more of: a nonce, a random number, a counter, a S-NSSAI, a DNN and a 5QI parameter (i.e., where each RRC Reconfiguration message per DRB also contains the at least one Freshness parameter used to derive the distinct UP keys).

In some embodiments, the processor derives the distinct UP integrity key (i.e., $K_{CU\text{-}UPint}$) using a common UP integrity Key (i.e., $K_{UPint}$) as an input key and using the UP Security Indicator, a length of the UP Security Indicator, at least one Freshness parameter, and a length of the at least one Freshness parameter as additional inputs to the KDF. Moreover, the processor derives the distinct UP ciphering key (i.e., $K_{CU\text{-}UPenc}$) using a common UP ciphering Key (i.e., $K_{UPenc}$) as an input key and using the UP Security Indicator, a length of the UP Security Indicator, at least one Freshness parameter, and a length of the at least one Freshness parameter as additional inputs to the KDF. In such embodiments, the at least one Freshness parameter contains one or more of: a nonce, a random number, a counter, a S-NSSAI, a DNN and a 5QI parameter.

In some embodiments, the transceiver receives UE Service information from a Network Function (i.e., AMF or SMF). Here, the UE Service information contains at least one of S-NSSAI, DNN and 5QI parameters. In such embodiments, the processor selects the CU-UP node based on the UE Service Information. In some embodiments, the transceiver receives UE capabilities for support of multiple UP security contexts. In such embodiments, the processor selects the CU-UP node based on the received UE capabilities.

In some embodiments, the processor determines to derive a distinct UP security context with cryptographic separation from a common UP security context based on at least one of: a trust level of the selected CU-UP node, security domain information, a deployment location, and a local policy of the apparatus.

In some embodiments, the setup request message further contains a Security Capability of the UE. In such embodiments, the setup response message contains UP Protection algorithms selected by the CU-UP node based on the Security Capability of the UE and a Security Capability of the selected CU-UP node. As described above, the UP Protection algorithms may include Ciphering and Integrity algorithms.

In some embodiments, the transceiver receives a Security Capability of the selected CU-UP node and the processor performs UP ciphering and integrity algorithm negotiation and selection based on the Security Capability of the selected CU-UP node and also based on a Security Capability of the UE. In certain embodiments, the setup request message further contains the selected the UP ciphering and integrity algorithms.

In some embodiments, the processor stores the assigned UP Security Indicator, at least one Freshness parameter, the corresponding freshly derived distinct UP integrity and ciphering keys (i.e., $K_{CU\text{-}UPint}$ and $K_{CU\text{-}UPenc}$), corresponding selected UP ciphering and integrity algorithms, UE ID, an identity of the selected CU-UP node, and at least one DRB identity to local memory.

Disclosed herein is a first method for setting up multiple UP security contexts, according to embodiments of the disclosure. The first method may be performed by a RAN CU-CP node in a mobile communication network, such as the base unit 121, the gNB-CU-CP 215, and/or the network apparatus 900, described above. The first method includes deriving distinct UP integrity and ciphering keys (i.e., $K_{CU\text{-}UPint}$ and $K_{CU\text{-}UPenc}$) for a selected CU-UP node in the RAN, said derivation using a KDF. The first method includes assigning a UP Security Indicator (also referred to as a UP Security Indicator) to uniquely identify the derived distinct UP integrity and ciphering keys (i.e., $K_{CU\text{-}UPint}$ and $K_{CU\text{-}UPenc}$) and sending a setup request to the selected CU-UP node, said setup request containing the UP Security Indicator and the distinct UP integrity and ciphering keys. The first method includes receiving a setup response from the selected CU-UP node and activating distinct UP security at a UE.

In some embodiments, activating the distinct UP security at the UE includes sending an Access Stratum ("AS") Security Mode Command ("SMC") message to the UE and independently activating UP security for a set of Data Radio Bearers ("DRBs") by sending an RRC Reconfiguration message per DRB to the UE. Here, the AS SMC message may contain the UP Security Indicator, at least one Freshness parameter, selected UP Protection algorithms (i.e., Ciphering and Integrity algorithms). Moreover, the RRC Reconfiguration message may contain the UP Security Indicator, an Enable UP Security Separation Indication, at least one Freshness parameter and UP security indications (e.g., Integrity and Ciphering indications).

In some embodiments, activating the distinct UP security at the UE includes sending an RRC Reconfiguration message to the UE, said RRC Reconfiguration message containing the UP Security Indicator, an Enable UP Security Separation Indication, at least one Freshness parameter, selected UP Protection algorithms (i.e., Ciphering and Integrity algorithms), and UP security indications (e.g., conventional UP security information).

In some embodiments, the first method further includes receiving an RRC Connection Reconfiguration Complete Message from the UE, said RRC Connection Reconfiguration Complete Message containing an UP Security Activation Success Indication along with the UP Security Indicator. In such embodiments, the first method may also include sending a confirmation message to the selected CU-UP node to inform of the successful UP security activation, said confirmation message containing the UP Security Indicator and a UP Security Activation Success Indication.

In the above embodiments, the distinct UP keys (i.e., $K_{CU\text{-}UPint}$ and $K_{CU\text{-}UPenc}$) may be derived using a RAN node key (i.e., $K_{gNB}$) as an input key and using the UP Security Indicator, a length of the UP Security Indicator, at least one Freshness parameter, and a length of the at least one Freshness parameter as additional inputs to the KDF. Here, the at least one Freshness parameter contains one or more of: a nonce, a random number, a counter, a S-NSSAI, a DNN and a 5QI parameter (i.e., where each RRC Reconfiguration message per DRB also contains the at least one Freshness parameter used to derive the distinct UP keys).

In some embodiments, the distinct UP integrity key (i.e., $K_{CU\text{-}UPint}$) may be derived using a common UP integrity Key (i.e., $K_{UPint}$) as an input key and using the UP Security Indicator, a length of the UP Security Indicator, at least one Freshness parameter, and a length of the at least one Freshness parameter as additional inputs to the KDF. Moreover, the distinct UP ciphering key (i.e., $K_{CU-UPenc}$) may be derived using a common UP ciphering Key (i.e., $K_{UPenc}$) as an input key and using the UP Security Indicator, a length of the UP Security Indicator, at least one Freshness parameter, and a length of the at least one Freshness parameter as additional inputs to the KDF. In such embodiments, the at least one Freshness parameter contains one or more of: a nonce, a random number, a counter, a S-NSSAI, a DNN and a 5QI parameter.

In some embodiments, the first method further includes receiving UE Service information from a Network Function (i.e., AMF or SMF). Here, the UE Service information contains at least one of S-NSSAI, DNN and 5QI parameters. In such embodiments, the CU-UP node is selected based on the UE Service Information. In some embodiments, the first method includes receiving UE capabilities for support of multiple UP security contexts. In such embodiments, the first method includes selecting the CU-UP node based on the received UE capabilities.

In some embodiments, the first method includes determining to derive a distinct UP security context with cryptographic separation from a common UP security context based on at least one of: a trust level of the selected CU-UP node, security domain information, a deployment location, and a local policy of the apparatus.

In some embodiments, the setup request message further includes a Security Capability of the UE. In such embodiments, the setup response message contains UP Protection algorithms selected by the CU-UP node based on the Security Capability of the UE and a Security Capability of the selected CU-UP node. As described above, the UP Protection algorithms may include Ciphering and Integrity algorithms.

In some embodiments, the first method includes receiving a Security Capability of the selected CU-UP node and performing UP ciphering and integrity algorithm negotiation and selection based on the Security Capability of the selected CU-UP node and also based on a Security Capability of the UE. In certain embodiments, the setup request message further contains the selected the UP ciphering and integrity algorithms.

In some embodiments, the first method includes storing the assigned UP Security Indicator, at least one Freshness parameter, the corresponding freshly derived distinct UP integrity and ciphering keys (i.e., $K_{CU-UPint}$ and $K_{CU-UPenc}$), corresponding selected UP ciphering and integrity algorithms, UE ID, an identity of the selected CU-UP node, and at least one DRB identity to local memory.

Disclosed herein is a second apparatus for setting up multiple UP security contexts, according to embodiments of the disclosure. The second apparatus may be implemented by a RAN CU-UP node in a mobile communication network, such as the base unit 121, the gNB-CU-UP 220, and/or the network apparatus 900, described above. The second apparatus includes a processor and a transceiver that receives a setup request message from a central unit control plane ("CU-CP") node in the RAN (i.e., gNB-CU-CP), said setup request containing a user plane ("UP") Security Indicator, User Equipment device ("UE") Security Capabilities, and distinct UP integrity and ciphering keys. The processor selects UP ciphering and integrity algorithms based on the received UE security capabilities. Via the transceiver, the processor sends the selected UP ciphering and integrity algorithms to the CU-CP node and receives an UP Security Activation Success Indication along with the UP Security Indicator from the CU-CP node.

In some embodiments, selecting the UP ciphering and integrity algorithms based on the UE Security Capabilities includes both selecting a highest priority UP ciphering algorithm from a configured list of algorithms and selecting a highest priority UP integrity algorithm from the configured list of algorithms. In various embodiments, the setup request message further contains at least one Freshness parameter. In such embodiments, the at least one Freshness parameter contains one or more of: a nonce, a random number, a counter, a S-NSSAI, a DNN and a 5QI parameter. In certain embodiments, the processor stores the received UP Security Indicator, distinct UP integrity and ciphering keys (i.e., $K_{CU-UPint}$ and $K_{CU-UPenc}$), at least one Freshness parameter, UE Security Capabilities and the selected UP ciphering and integrity algorithms to local memory.

In some embodiments, the processor activates UP integrity and ciphering protection in response to receiving the UP Security Activation Success Indication and UP Security Indicator from the CU-CP node. In certain embodiments, the processor activates UP integrity and ciphering protection by applying the distinct UP integrity and ciphering keys (i.e., $K_{CU-UPint}$ and $K_{CU-UPenc}$) received from the CU-CP node for encryption and integrity protection of UP messages and/or of DRBs terminating at its side.

In some embodiments, the processor uses a UP message packet, the UP Security Indicator, a length of the UP Security Indicator, the at least one Freshness parameter, and a length of the at least one Freshness parameter inputs to the UP integrity protection algorithm, where the UP integrity Key (i.e., $K_{CU-UPint}$) corresponding to the UP Security Indicator is used for the UP integrity protection.

In some embodiments, the processor uses a UP message packet, the UP Security Indicator, a length of the UP Security Indicator, the at least one Freshness parameter, and a length of the at least one Freshness parameter as inputs to a UP encryption/confidentiality protection algorithm, where the UP ciphering Key (i.e., $K_{CU-UPenc}$) corresponding to the UP Security Indicator is used for the UP confidentiality protection.

Disclosed herein is a second method for setting up multiple UP security contexts, according to embodiments of the disclosure. The second method may be performed by a RAN CU-UP node in a mobile communication network, such as the base unit 121, the gNB-CU-UP 220, and/or the network apparatus 900, described above. The second method includes receives a setup request message from a central unit control plane ("CU-CP") node in the RAN (i.e., gNB-CU-CP) and selecting UP ciphering and integrity algorithms based on the received UE security capabilities, said setup request containing a user plane ("UP") Security Indicator, User Equipment device ("UE") Security Capabilities, and distinct UP integrity and ciphering keys. The second method includes sending the selected UP ciphering and integrity algorithms to the CU-CP node and receiving an UP Security Activation Success Indication along with the UP Security Indicator from the CU-CP node.

In some embodiments, selecting the UP ciphering and integrity algorithms based on the UE Security Capabilities includes both selecting a highest priority UP ciphering algorithm from a configured list of algorithms and selecting a highest priority UP integrity algorithm from the configured list of algorithms. In various embodiments, the setup request message further contains at least one Freshness parameter. In such embodiments, the at least one Freshness parameter contains one or more of: a nonce, a random number, a counter, a S-NSSAI, a DNN and a 5QI parameter. In certain embodiments, the second method includes storing the received UP Security Indicator, distinct UP integrity and ciphering keys ($K_{CU-UPint}$ and $K_{CU-UPenc}$), at least one Freshness parameter, UE Security Capabilities and the selected UP ciphering and integrity algorithms to local memory.

In some embodiments, the second method includes activating UP integrity and ciphering protection in response to receiving the UP Security Activation Success Indication and UP Security Indicator from the CU-CP node. In certain embodiments, the second method includes activating UP integrity and ciphering protection by applying the distinct UP integrity and ciphering keys (i.e., $K_{CU-UPint}$ and $K_{CU-UPenc}$) received from the CU-CP node for encryption and integrity protection of UP messages and/or of DRBs terminating at its side.

In some embodiments, the second method includes using a UP message packet, the UP Security Indicator, a length of the UP Security Indicator, the at least one Freshness parameter, and a length of the at least one Freshness parameter inputs to the UP integrity protection algorithm, where the UP integrity Key (i.e., $K_{CU-UPint}$) corresponding to the UP Security Indicator is used for the UP integrity protection.

In some embodiments, the second method includes using a UP message packet, the UP Security Indicator, a length of the UP Security Indicator, the at least one Freshness parameter, and a length of the at least one Freshness parameter as inputs to a UP encryption/confidentiality protection algorithm, where the UP ciphering Key (i.e., $K_{CU-UPenc}$) corresponding to the UP Security Indicator is used for the UP confidentiality protection.

Disclosed herein is a third apparatus for setting up multiple UP security contexts, according to embodiments of the disclosure. The third apparatus may be implemented by a user equipment device in a mobile communication network, such as the remote unit 105, the UE 205, and/or the user equipment apparatus 800, described above. The third apparatus includes a processor and a transceiver that sends UE Capabilities for support of multiple UP security contexts to the network (i.e., to AMF) in a Non-Access Stratum ("NAS") message. The transceiver further receives an Access Stratum ("AS") Security Mode Command ("SMC") message from a central unit control plane ("CU-CP") node and receives at least one RRC Reconfiguration message from the CU-CP node to activate distinct/independent UP security at the UE for specific Data Radio Bearers ("DRBs").

Here, the AS SMC message contains a UP Security Indicator and related UP Protection algorithms (i.e., Ciphering and Integrity algorithms for distinct UP Security). Moreover, the at least one RRC Reconfiguration message containing the UP Security Indicator, an Enable UP Security Separation Indication, at least one Freshness parameter.

The processor derives distinct UP integrity and ciphering keys ($K_{CU-UPint}$ and $K_{CU-UPenc}$) using a key derivation function ("KDF"). The transceiver sends the UP Security Activation Success Indication along with UP Security Indicator in RRC Connection Reconfiguration Complete Message to the CU-CP node.

In some embodiments, the processor stores the received UP Security Indicator, the at least one Freshness parameter, and UP Protection algorithms (e.g., Ciphering and Integrity algorithms) as part of a distinct (i.e., independent) UP Security context at the UE memory, e.g., after a successful AS SMC procedure. In such embodiments, the processor uses the UP Security Indicator to uniquely identify the distinct UE security context stored locally at the UE. In various embodiments, the distinct UE security context contains the UP Security Indicator, the at least one Freshness parameter, the UP Protection algorithms (e.g., Ciphering and Integrity algorithms for distinct UP Security), UP integrity and ciphering keys (i.e., $K_{CU-UPint}$ and $K_{CU-UPenc}$), at least one DRB Identifier ("ID"), and the UP security indications (e.g., UP Security integrity and Ciphering indications).

In some embodiments, the processor further verifies the RRC Reconfiguration message and, in response to successful RRC Reconfiguration message verification, stores the (i.e., freshly derived) distinct UP integrity and ciphering keys ($K_{CU-UPint}$ and $K_{CU-UPenc}$) along with the UP Security Indicator and the at least one Freshness parameter as part of the distinct UP Security context at the UE memory. In various embodiments, the at least one Freshness parameter contains one or more of: a nonce, a random number, a counter, a S-NSSAI, a DNN and a 5QI parameter. In certain embodiments, the processor uses the UP Security Indicator to uniquely identify a distinct UP security context to protect UP message packets belonging to a DRB as indicated by the RRC Reconfiguration message.

In some embodiments, the processor derives the distinct UP integrity and ciphering keys (i.e., $K_{CU-UPint}$ and $K_{CU-UPenc}$) in response to receiving an Enable UP Security Separation Indication in the RRC Reconfiguration message. In some embodiments, the processor derives the distinct UP integrity and ciphering keys (i.e., $K_{CU-UPint}$ and $K_{CU-UPenc}$) using a Radio Access Network ("RAN") node key (i.e., $K_{gNB}$) as an input key and using the UP Security Indicator, a length of the UP Security Indicator, the at least one Freshness parameter, and a length of the input as an additional input to the KDF.

In some embodiments, the processor derives the distinct UP integrity key (i.e., $K_{CU-UPint}$) using a common UP integrity Key (i.e., $K_{UPint}$) as an input key and using the UP Security Indicator, a length of the UP Security Indicator, the at least one Freshness parameter, and a length of the at least one Freshness parameter as additional inputs to the KDF. In some embodiments, the processor derives the distinct UP ciphering key (i.e., $K_{CU-UPenc}$) using a common UP ciphering Key (i.e., $K_{UPenc}$) as an input key and using the UP Security Indicator, a length of the UP Security Indicator, the at least one Freshness parameter, and a length of the at least one Freshness parameter as additional inputs to the KDF.

In some embodiments, the processor uses a UP message packet, the UP Security Indicator, a length of the UP Security Indicator, the at least one Freshness parameter, and a length of the at least one Freshness parameter inputs to the UP integrity protection algorithm, where the UP integrity Key (i.e., $K_{CU-UPint}$) corresponding to the UP Security Indicator is used for the UP integrity protection. In some embodiments, the processor uses a UP message packet, the UP Security Indicator, a length of the UP Security Indicator, the at least one Freshness parameter, and a length of the at least one Freshness parameter as inputs to a UP encryption/confidentiality protection algorithm, where the UP ciphering Key (i.e., $K_{CU-UPenc}$) corresponding to the UP Security Indicator is used for the UP confidentiality protection.

Disclosed herein is a third method for setting up multiple UP security contexts, according to embodiments of the disclosure. The third method may be performed by a user equipment device in a mobile communication network, such as the remote unit 105, the UE 205, and/or the user equipment apparatus 800. The third method includes sending UE Capabilities for support of multiple UP security contexts to the network (i.e., to AMF) in a NAS message. The third method further includes receiving an AS SMC message from a CU-CP node and receiving at least one RRC Reconfiguration message from the CU-CP node to activate distinct/independent UP security at the UE for specific DRBs.

Here, the AS SMC message contains a UP Security Indicator and related UP Protection algorithms (i.e., Ciphering and Integrity algorithms for distinct UP Security). Note that the AS SMC message may also include Common RRC and UP security algorithms. Moreover, the at least one RRC Reconfiguration message containing the UP Security Indicator, an Enable UP Security Separation Indication, at least one Freshness parameter.

The third method includes deriving distinct UP integrity and ciphering keys (i.e., $K_{CU\text{-}UPint}$ and $K_{CU\text{-}UPenc}$) using a KDF and sending the UP Security Activation Success Indication along with UP Security Indicator in RRC Connection Reconfiguration Complete Message to the CU-CP node.

In some embodiments, the third method includes storing the received UP Security Indicator, the at least one Freshness parameter, and UP Protection algorithms (e.g., Ciphering and Integrity algorithms) as part of a distinct (i.e., independent) UP Security context at the UE memory, e.g., after a successful AS SMC procedure. In such embodiments, the third method includes using the UP Security Indicator to uniquely identify the distinct UE security context stored locally at the UE. In various embodiments, the distinct UE security context contains the UP Security Indicator, the at least one Freshness parameter, the UP Protection algorithms (e.g., Ciphering and Integrity algorithms for distinct UP Security), UP integrity and ciphering keys (i.e., $K_{CU\text{-}UPint}$ and $K_{CU\text{-}UPenc}$), at least one DRB Identifier ("ID"), and the UP security indications (e.g., UP Security integrity and Ciphering indications).

In some embodiments, the third method further includes verifying the RRC Reconfiguration message and, in response to successful RRC Reconfiguration message verification, storing the (i.e., freshly derived) distinct UP integrity and ciphering keys ($K_{CU\text{-}UPint}$ and $K_{CU\text{-}UPenc}$) along with the UP Security Indicator and the at least one Freshness parameter as part of the distinct UP Security context at the UE memory. In various embodiments, the at least one Freshness parameter contains one or more of: a nonce, a random number, a counter, a S-NSSAI, a DNN and a 5QI parameter. In certain embodiments, the third method includes using the UP Security Indicator to uniquely identify a distinct UP security context to protect UP message packets belonging to a DRB as indicated by the RRC Reconfiguration message.

In some embodiments, the third method includes deriving the distinct UP integrity and ciphering keys (i.e., $K_{CU\text{-}UPint}$ and $K_{CU\text{-}UPenc}$) in response to receiving an Enable UP Security Separation Indication in the RRC Reconfiguration message. In some embodiments, the third method includes deriving the distinct UP integrity and ciphering keys (i.e., $K_{CU\text{-}UPint}$ and $K_{CU\text{-}UPenc}$) using a Radio Access Network ("RAN") node key (i.e., $K_{gNB}$) as an input key and using the UP Security Indicator, a length of the UP Security Indicator, the at least one Freshness parameter, and a length of the input as an additional input to the KDF.

In some embodiments, the third method includes deriving the distinct UP integrity key (i.e., $K_{CU\text{-}UPint}$) using a common UP integrity Key (i.e., $K_{UPint}$) as an input key and using the UP Security Indicator, a length of the UP Security Indicator, the at least one Freshness parameter, and a length of the at least one Freshness parameter as additional inputs to the KDF. In some embodiments, the third method includes deriving the distinct UP ciphering key (i.e., $K_{CU\text{-}UPenc}$)

using a common UP ciphering Key (i.e., $K_{UPenc}$) as an input key and using the UP Security Indicator, a length of the UP Security Indicator, the at least one Freshness parameter, and a length of the at least one Freshness parameter as additional inputs to the KDF.

In some embodiments, the third method includes using a UP message packet, the UP Security Indicator, a length of the UP Security Indicator, the at least one Freshness parameter, and a length of the at least one Freshness parameter inputs to the UP integrity protection algorithm, where the UP integrity Key (i.e., $K_{CU\text{-}UPint}$) corresponding to the UP Security Indicator is used for the UP integrity protection. In some embodiments, the third method includes using a UP message packet, the UP Security Indicator, a length of the UP Security Indicator, the at least one Freshness parameter, and a length of the at least one Freshness parameter as inputs to a UP encryption/confidentiality protection algorithm, where the UP ciphering Key (i.e., $K_{CU\text{-}UPenc}$) corresponding to the UP Security Indicator is used for the UP confidentiality protection.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A Radio Access Network ("RAN") central unit control plane ("CU-CP") apparatus, the RAN CU-CP apparatus comprising:
  a memory; and
  a processor coupled with the memory and configured to cause the apparatus to:
    derive distinct user plane ("UP") integrity and ciphering keys for a selected central unit user plane ("CU-UP") node in the RAN, wherein the derivation uses a key derivation function ("KDF");
    assign a UP Security Indicator to uniquely identify the distinct UP integrity and ciphering keys;
    transmit a setup request message to the selected CU-UP node, the setup request message comprising the UP Security Indicator and the distinct UP integrity and ciphering keys;
    receive a setup response message from the selected CU-UP node; and
    activate a distinct UP security at a User Equipment ("UE") for a set of Data Radio Bearers ("DRBs") by transmitting an RRC Reconfiguration message per DRB to the UE, the RRC Reconfiguration message comprising the UP Security Indicator and an Enable UP Security Separation Indication.

2. The apparatus of claim 1, wherein, to activate the distinct UP security at the UE, the processor is configured to cause the apparatus to:
  transmit, to the UE, an Access Stratum ("AS") Security Mode Command ("SMC") message comprising the UP Security Indicator, at least one Freshness parameter, and selected UP Protection algorithms.

3. The apparatus of claim 1, wherein, to activate the distinct UP security at the UE, the processor is configured to cause the apparatus to:
  transmit, to the UE, a radio resource control ("RRC") Reconfiguration message comprising the UP Security Indicator, an Enable UP Security Separation Indication, at least one Freshness parameter, and selected UP Protection algorithms.

4. The apparatus of claim 1, wherein the processor is further configured to cause the apparatus to:

receive, from the UE, a radio resource control ("RRC") Connection Reconfiguration Complete Message comprising an UP Security Activation Success Indication along with the UP Security Indicator; and transmit a confirmation message to the selected CU-UP node to inform of the successful UP security activation, the confirmation message comprising the UP Security Indicator and a UP Security Activation Success Indication.

5. The apparatus of claim 1, wherein the processor is configured to cause the apparatus to derive the distinct UP integrity and ciphering keys using a RAN node key as an input key and using the UP Security Indicator, a length of the UP Security Indicator, at least one Freshness parameter, and a length of the at least one Freshness parameter as additional inputs to the KDF, wherein the at least one Freshness parameter comprises one or more of: a nonce, a random number, a counter, a single network slices selection assistance information ("S-NSSAI") parameter, a data network name ("DNN") or a fifth-generation quality of service indicator ("5QI") parameter.

6. The apparatus of claim 1, wherein the processor is configured to cause the apparatus to:

derive the distinct UP integrity key using a common UP integrity Key as an input key and using the UP Security Indicator, a length of the UP Security Indicator, at least one Freshness parameter, and a length of the at least one Freshness parameter as additional inputs to the KDF, and derive the distinct UP ciphering key using a common UP ciphering Key as an input key and using the UP Security Indicator, a length of the UP Security Indicator, at least one Freshness parameter, and a length of the at least one Freshness parameter as additional inputs to the KDF, wherein the at least one Freshness parameter comprises one or more of: a nonce, a random number, a counter, a single network slices selection assistance information ("S-NSSAI") parameter, a data network name ("DNN") or a fifth-generation quality of service indicator ("5QI") parameter.

7. The apparatus of claim 1, wherein the processor is configured to cause the apparatus to:

receive, from a Network Function, UE Service information comprising one or more of a single network slices selection assistance information ("S-NSSAI") parameter, a data network name ("DNN") or a fifth-generation quality of service indicator ("5QI") parameter;

select the CU-UP node based on the UE Service Information;

receive UE capabilities for support of multiple UP security contexts; and select the CU-UP node based on the UE capabilities.

8. The apparatus of claim 1, wherein the processor is configured to cause the apparatus to determine to derive a distinct UP security context with cryptographic separation from a common UP security context based on one or more of: a trust level of the selected CU-UP node, security domain information, a deployment location, or a local policy of the apparatus.

9. The apparatus of claim 1, wherein the setup request message further comprises a Security Capability of the UE, wherein the setup response message comprises UP Protection algorithms selected by the CU-UP node based on the Security Capability of the UE and a Security Capability of the selected CU-UP node.

10. The apparatus of claim 1, wherein the processor is configured to cause the apparatus to store, in the memory, the assigned UP Security Indicator, at least one Freshness parameter, the distinct UP integrity and ciphering keys, corresponding selected UP ciphering and integrity algorithms, a UE identifier ("ID"), an identity of the selected CU-UP node, and at least one DRB identity.

11. A method performed by a Radio Access Network ("RAN") central unit control plane ("CU-CP"), the method comprising:

deriving distinct user plane ("UP") integrity and ciphering keys for a selected central unit user plane ("CU-UP") node in the RAN, wherein the derivation uses a key derivation function ("KDF");

assigning a UP Security Indicator to uniquely identify the distinct UP integrity and ciphering keys;

transmitting a setup request message to the selected CU-UP node, the setup request message comprising the UP Security Indicator and the distinct UP integrity and ciphering keys;

receive a setup response message from the selected CU-UP node; and activate a distinct UP security at a User Equipment ("UE") for a set of Data Radio Bearers ("DRBs") by transmitting an RRC Reconfiguration message per DRB to the UE, the RRC Reconfiguration message comprising the UP Security Indicator and an Enable UP Security Separation Indication.

12. The method of claim 11, wherein activating the distinct UP security at the UE comprises:

transmitting, to the UE, an Access Stratum ("AS") Security Mode Command ("SMC") message comprising the UP Security Indicator, at least one Freshness parameter, and selected UP Protection algorithms.

13. The method of claim 11, wherein activating the distinct UP security at the UE comprises:

transmitting, to the UE, a radio resource control ("RRC") Reconfiguration message comprising the UP Security Indicator, an Enable UP Security Separation Indication, at least one Freshness parameter, and selected UP Protection algorithms.

14. The method of claim 11, further comprising:

receiving, from the UE, a radio resource control ("RRC") Connection Reconfiguration Complete Message comprising an UP Security Activation Success Indication along with the UP Security Indicator; and transmitting a confirmation message to the selected CU-UP node to inform of the successful UP security activation, the confirmation message comprising the UP Security Indicator and a UP Security Activation Success Indication.

15. The method of claim 11, further comprising:

deriving the distinct UP integrity and ciphering keys using a RAN node key as an input key and using the UP Security Indicator, a length of the UP Security Indicator, at least one Freshness parameter, and a length of the at least one Freshness parameter as additional inputs to the KDF, wherein the at least one Freshness parameter comprises one or more of: a nonce, a random number, a counter, a single network slices selection assistance information ("S-NSSAI") parameter, a data network name ("DNN") or a fifth-generation quality of service indicator ("5QI") parameter.

16. The method of claim 11, further comprising:

deriving the distinct UP integrity key using a common UP integrity Key as an input key and using the UP Security Indicator, a length of the UP Security Indicator, at least one Freshness parameter, and a length of the at least one Freshness parameter as additional inputs to the KDF, and deriving the distinct UP ciphering key using a common UP ciphering Key as an input key and using the UP Security Indicator, a length of the UP Security Indicator, at least one Freshness parameter, and a length of the at least one Freshness parameter as additional inputs to the KDF, wherein the at least one Freshness parameter comprises one or more of: a nonce, a random number, a counter, a single network slices selection assistance information ("S-NSSAI") parameter, a data network name ("DNN") or a fifth-generation quality of service indicator ("5QI") parameter.

17. The method of claim 11, further comprising:

receiving, from a Network Function, UE Service information comprising one or more of a single network slices selection assistance information ("S-NSSAI") parameter, a data network name ("DNN") or a fifth-generation quality of service indicator ("5QI") parameter;

selecting the CU-UP node based on the UE Service Information;

receiving UE capabilities for support of multiple UP security contexts; and selecting the CU-UP node based on the received UE capabilities.

18. The method of claim 11, further comprising:

determining to derive a distinct UP security context with cryptographic separation from a common UP security context based on one or more of: a trust level of the selected CU-UP node, security domain information, a deployment location, or a local policy of the RAN CU-CP.

19. The method of claim 11, wherein the setup request message further comprises a Security Capability of the UE, wherein the setup response message comprises UP Protection algorithms selected by the CU-UP node based on the Security Capability of the UE and a Security Capability of the selected CU-UP node.

20. The method of claim 11, further comprising:

storing, in at least one memory, the assigned UP Security Indicator, at least one Freshness parameter, the distinct UP integrity and ciphering keys, corresponding selected UP ciphering and integrity algorithms, a UE identifier ("ID"), an identity of the selected CU-UP node, and at least one DRB identity.

* * * * *